(12) United States Patent
Green et al.

(10) Patent No.: US 9,003,443 B2
(45) Date of Patent: Apr. 7, 2015

(54) SYSTEMS, METHODS AND ARTICLES TO PROVIDE CONTENT IN NETWORKED ENVIRONMENT

(71) Applicant: Abacast, Inc., Vancouver, WA (US)

(72) Inventors: Robert D. Green, Seattle, WA (US); Brian S. Bosworth, Edgewater, MD (US); James M. Kott, Kirkland, WA (US); John W. Morris, IV, Washougal, WA (US)

(73) Assignee: Wideorbit Inc., San Francisco, CA (US)

( * ) Notice: Subject to any disclaimer, the term of this patent is extended or adjusted under 35 U.S.C. 154(b) by 0 days.

(21) Appl. No.: 13/956,020

(22) Filed: Jul. 31, 2013

(65) Prior Publication Data

US 2014/0068648 A1     Mar. 6, 2014

Related U.S. Application Data

(60) Provisional application No. 61/677,968, filed on Jul. 31, 2012.

(51) Int. Cl.
*H04N 7/10*     (2006.01)
(Continued)

(52) U.S. Cl.
CPC ......... *H04N 21/4394* (2013.01); *H04N 21/266* (2013.01); *H04N 21/2358* (2013.01); *H04N 21/23614* (2013.01); *H04N 21/233* (2013.01); *H04N 21/2353* (2013.01); *H04N 21/222* (2013.01); *H04N 21/23109* (2013.01)

(58) Field of Classification Search
CPC .......... H04N 21/222; H04N 21/23109; H04N 21/233; H04N 21/2353; H04N 21/2358; H04N 21/23614
See application file for complete search history.

(56) References Cited

U.S. PATENT DOCUMENTS 6,487,721 B1    11/2002   Safadi
6,577,716 B1    6/2003   Minter et al.
(Continued)

OTHER PUBLICATIONS

Green et al., "Systems, Methods and Articles to Automatically Expose and Place Material in Streams of Programming," Office Action mailed May 14, 2014, for U.S. Appl. No. 13/679,828, 49 pages.
Green et al., "Systems and Methods to Deliver a Personalized Mediacast," U.S. Appl. No. 61/611,403, filed Mar. 15, 2012, 75 pages.

(Continued)

*Primary Examiner* — Dominic D Saltarelli
(74) *Attorney, Agent, or Firm* — Seed IP Law Group PLLC

(57) ABSTRACT

Content delivery system may include a metadata tunnel system component which is responsive to defined subaudible tones in programming, for instance programming provided for a broadcast. An action may be based on a characteristic or aspect of the subaudible tone, for instance frequency and/or duration. The metadata tunnel system may selectively generate or provide modified or new metadata to downstream components (e.g., injector system, encoder). The metadata tunnel system may provide metadata that causes a content provider identifier that identifies a content provider to appear in an alternative feed of programming (e.g., streaming programming) at points downstream of a broadcaster, for instance at end user media players. The metadata tunnel system may provide metadata that inhibits an injector system from injecting (e.g., inserting, substituting) new content into the alternative feed of programming created from portions of broadcast programming.

14 Claims, 7 Drawing Sheets

(51) Int. Cl.

| | |
|---|---|
| *H04N 7/025* | (2006.01) |
| *H04N 21/439* | (2011.01) |
| *H04N 21/266* | (2011.01) |
| *H04N 21/235* | (2011.01) |
| *H04N 21/236* | (2011.01) |
| *H04N 21/233* | (2011.01) |
| *H04N 21/222* | (2011.01) |
| *H04N 21/231* | (2011.01) |

(56) References Cited

U.S. PATENT DOCUMENTS

| | | |
|---|---|---|
| 7,412,714 B2 | 8/2008 | Kitayama |
| 7,676,405 B2 | 3/2010 | Steelberg et al. |
| 7,752,642 B2 | 7/2010 | Lemmons |
| 8,230,037 B2 | 7/2012 | Story et al. |
| 8,381,244 B2 | 2/2013 | King et al. |
| 8,812,637 B2 | 8/2014 | Cragun et al. |
| 2001/0023498 A1 | 9/2001 | Cosmao et al. |
| 2002/0078443 A1 | 6/2002 | Gadkari et al. |
| 2003/0033157 A1 | 2/2003 | Dempski et al. |
| 2003/0188320 A1 | 10/2003 | Shing |
| 2004/0025176 A1 | 2/2004 | Franklin et al. |
| 2004/0088726 A1* | 5/2004 | Ma et al. .......... 725/46 |
| 2004/0128682 A1 | 7/2004 | Liga et al. |
| 2004/0133467 A1 | 7/2004 | Siler |
| 2007/0074243 A1 | 3/2007 | Verhaegh et al. |
| 2007/0220411 A1 | 9/2007 | Hauser |
| 2009/0031037 A1 | 1/2009 | Mendell et al. |
| 2010/0269138 A1* | 10/2010 | Krikorian et al. .......... 725/39 |
| 2010/0280889 A1 | 11/2010 | Gabriel et al. |
| 2010/0293046 A1 | 11/2010 | Cooke et al. |
| 2013/0132997 A1 | 5/2013 | King et al. |
| 2013/0144723 A1 | 6/2013 | Green et al. |
| 2013/0198328 A1 | 8/2013 | Green et al. |
| 2013/0246567 A1 | 9/2013 | Green et al. |
| 2013/0282495 A1 | 10/2013 | Gilbane et al. |

OTHER PUBLICATIONS

Green et al., "Systems and Methods to Deliver a Personalized Mediacast With an Uninterrupted Lead-In Portion," U.S. Appl. No. 61/877,182, filed Sep. 12, 2013, 171 pages.

Green et al., "Systems, Methods and Articles to Automatically Expose and Place Material in Streams of Programming," U.S. Appl. No. 61/561,186, filed Nov. 17, 2011, 70 pages.

Green et al., "Systems, Methods and Articles to Provide Content in Networked Environment," U.S. Appl. No. 61/587,475, filed Jan. 17, 2012, 98 pages.

Green et al., "Systems, Methods and Articles to Provide Content in Networked Environment," U.S. Appl. No. 61/677,968, filed Jul. 31, 2012, 84 pages.

King et al., "Content Injection System and Methodology," Office Action mailed Jul. 7, 2010, for U.S. Appl. No. 11/985,143, 12 pages.

King et al., "Content Injection System and Methodology," Amendment filed Jan. 7, 2011, for U.S. Appl. No. 11/985,143, 11 pages.

King et al., "Content Injection System and Methodology," Supplementary Response filed Jan. 20, 2011, for U.S. Appl. No. 11/985,143, 13 pages.

King et al., "Content Injection System and Methodology," Office Action mailed Mar. 29, 2011, for U.S. Appl. No. 11/985,143, 15 pages.

King et al., "Content Injection System and Methodology," Amendment filed May 27, 2011, for U.S. Appl. No. 11/985,143, 21 pages.

King et al., "Content Injection System and Methodology," Office Action mailed Feb. 21, 2012, for U.S. Appl. No. 11/985,143, 14 pages.

King et al., "Content Injection System and Methodology," Amendment filed Jul. 6, 2012, for U.S. Appl. No. 11/985,143, 25 pages.

King et al., "Content Injection System and Methodology," Notice of Allowance mailed Oct. 15, 2012, for U.S. Appl. No. 11/985,143, 16 pages.

King et al., "Content Injection System and Methodology," U.S. Appl. No. 60/860,573, filed Nov. 21, 2006, 7 pages.

Green et al., "Systems and Methods to Deliver a Personalized Mediacast," Notice of Allowance mailed Nov. 6, 2014, for U.S. Appl. No. 13/711,984, 22 pages.

\* cited by examiner

SYSTEMS, METHODS AND ARTICLES TO PROVIDE CONTENT IN NETWORKED ENVIRONMENT

BACKGROUND

1. Field

This disclosure generally relates to the automated provision of content to content consumers in a networked environment in a modified form from content broadcast by broadcasters, and more particularly to control over insertion of alternative content segments into a sequence of content segments, for example, insertion of alternative advertisements into Webcasts or other delivery of content.

2. Description of the Related Art

Broadcasters such as radio stations and networks or television stations and networks broadcast programming including media content which is the subject of programming. Broadcasters' delivery of media content is often via radio or television broadcasts. While content providers may employ repeaters and the like, broadcasts are typically limited in range to a geographic region.

Programming often includes advertisements interspersed with the subject matter of the programming or media content. The advertisements may occur in segments sometimes referred to as "ad breaks." Broadcasters typically sell advertising time to generate revenue to fund operation, as well as generate profits, where the broadcaster is a commercial entity rather than a nonprofit entity. Given that most broadcasts are local in nature or extent, broadcasters often carry advertisements and other material which is of a somewhat local or parochial interest. For example, a local chain may place advertisements with a local broadcaster since the audience targeted by the local chain is also often local and local advertising tends to be less expensive than regional or national advertising.

Often, broadcasters provide an alternative source of the programming, for example, providing a Webcast or even a podcast of the programming. The audience for the alternative source of programming may be significantly different from the audience for the broadcast. For example, the audience for the alternative source of programming may be more geographically diverse, or may be more comfortable with technologies such as streaming of content to desktop computers or even Smartphone devices. As such, the advertisements interspersed in a broadcast may not be particularly well suited, applicable or of interest to the audience of the alternative source of programming.

Broadcasters are increasingly using content delivery networks (CDNs) to cache content throughout a network. CDNs are typically a system of computers, often configured as servers, and may be geographically dispersed with respect to one another. CDNs are typically operated by third party entities. CDNs may improve access, for example allowing lowest cost routing and reducing latency. CDNs may also provide a measure of redundancy.

Broadcasters may receive media content from one or more content providers. For example, many radio broadcasters receive programming via a satellite feed of media content from a content provider. The satellite feed of programming may include advertisements or advertisement segments placed in the feed by the content provider.

Many broadcasters use automation systems and/or injection systems. Automation systems may detect markers in the programming, which indicate advertising segments and non-advertising portions of segments of the programming. Injection systems which may insert alternative content into a stream of the broadcast. Such alternative content is typically provided in the form of advertisements, hence the system may be referred to as an advertisement or "ad" injection system. The automation system may be communicatively coupled to trigger the injection system to insert advertisements in advertising segments of a streaming delivery of the programming, for example via the Worldwide Web portion of the Internet. These inserted advertisements typically take the place of advertisements, or other content, provided by the content provider.

New approaches that automate the various activities related to providing alternative transmission of programming, for example via streaming, are desirable.

BRIEF SUMMARY

A media content creator or provider inserts a defined or known subaudible tone at a start and/or end of each portion or segment of media content. One or more components of a content delivery system can monitor, in real-time, an incoming audio channel of programming received from the primary media source and take an action based on receipt of the defined subaudible tone. For example, if the subaudible tone matches a defined duration and frequency, the component(s) can correlate the detected frequency with a specific defined rule or set of instructions. The defined rule or set of instructions allows the component(s) to generate custom metadata, which the component(s) can transmit to another downstream component in a content delivery chain. The defined rule or set of instructions may also specify the particular downstream component to which the component(s) provides the custom metadata.

The component(s) can also be utilized to receive metadata information from a metadata provider, such as an automation system. The component(s) may buffer and suspend the transmission of the metadata for a time period long enough to detect a presence or absence of any defined subaudible tones. After the time period expires, the component(s) may transmit the metadata to another downstream component or stage in a content delivery chain. The component(s) may provide the metadata either in its original form, or completely modified based on defined rules or sets of instructions. The rule or set of instructions may be selected based on frequency and/or duration of the subaudible tone.

Additionally, or alternatively, the component(s) may insert or cause insertion of metadata which allows identification of the original content provider, even far downstream such as at an end user client.

A method of operation of at least one device in a content delivery system may be summarized as including monitoring an audio channel for subaudible tones associated with respective ones of at least some of a plurality of media content segments on the audio channel, by the at least one device; and in response to at least some of the subaudible tones, causing at least one of a modifying or an adding of metadata to a delivery of the media content segment associated with the respective subaudible tone, by the at least one device.

Monitoring an audio channel for subaudible tones may include monitoring an audio only feed without any metadata for the subaudible tones, and causing at least one of a modifying or an adding metadata in response may include providing the metadata to be added. Monitoring an audio only feed without any metadata for subaudible tones may include monitoring a satellite feed of audio content which omits metadata. Monitoring an audio channel for subaudible tones may include monitoring the audio channel of a feed of video content. Monitoring an audio channel for subaudible tones may include monitoring an audio feed of the media content segments logically associated with respective existing metadata for the subaudible tones, and causing at least one of a modifying or an adding metadata in response may include providing respective new metadata to modify the existing metadata for the respective media content segments. Causing at least one of a modifying or an adding of metadata to a delivery of the media content segment associated with the respective subaudible tone may include providing the metadata which causes an advertisement injection system located relatively downstream of the at least one device to pass the respective content segment without modification of any attributes thereof. Monitoring for subaudible tones may include monitoring audio for a subaudible tone of at least one defined duration and at least one defined frequency.

The method of operation of at least one device in a content delivery system may further include identifying at least one defined rule to apply based on at least one of the defined duration or the defined frequency of the subaudible tone in the audio, by the at least one device.

The method of operation of at least one device in a content delivery system may further include identifying at least one piece of metadata for inclusion in the delivery of the respective one of the media content segments based on the identified at least one rule, by the at least one device.

The method of operation of at least one device in a content delivery system may further include causing a downstream component to include the identified at least one piece of metadata in the delivery of the respective one of the media content segments in response to the identified at least one rule, by the at least one device.

Causing a downstream component to include the identified at least one piece of metadata in the delivery of the respective one of the media content segments in response to the identified at least one rule may include causing an advertisement insertion component to include the identified at least one piece of metadata in the delivery of the respective one of the media content segment.

Causing a downstream component to include the identified at least one piece of metadata in the delivery of the respective one of the media content segments in response to the identified at least one rule may include causing an encoder component to include the identified at least one piece of metadata in a streaming delivery of the respective one of the media content segments.

The at least one device may include a subaudible tone detection subsystem and a metadata processing subsystem and the method of operation of at least one device in a content delivery system may further include receiving metadata from an automation system by the subaudible tone detection subsystem, the received metadata for inclusion in the delivery of the respective media content segment; buffering the metadata received from the automation system; determining by the metadata processing subsystem whether a subaudible tone associated with the respective media content segment with a defined duration and a defined frequency is received within a defined duration of time, by the at least one device; and in response to determining that the subaudible tone of the defined duration and the defined frequency is not received within the defined duration of time, causing the inclusion of the buffered metadata in a streaming delivery of the respective one of the media content segments.

The at least one device may include a subaudible tone detection subsystem and a metadata processing subsystem; and the method of operation of at least one device in a content delivery system may further include receiving metadata from an automation system by the subaudible tone detection subsystem, the received metadata for inclusion in the delivery of the respective media content segment; buffering the metadata received from the automation system; determining by the metadata processing subsystem whether a subaudible tone associated with the respective media content segment with a defined duration and a defined frequency is received within a defined duration of time, by the subaudible tone detection subsystem; and in response to determining that the subaudible tone of the defined duration and the defined frequency is received within the defined duration of time, causing the inclusion of at least one modified piece of metadata in a streaming delivery of the respective one of the media content segments.

The at least one device may include a subaudible tone detection subsystem; and the method of operation of at least one device in a content delivery system may further include receiving the plurality of media content segments on the audio channel by the subaudible tone detection subsystem from at least one primary media source; encoding at least some of the media content segments and at least some modified metadata for streaming delivery by an encoder; and causing the encoded media content segments and modified metadata to be provided to an end user media content player.

The at least one device may include a metadata processing subsystem; and the method of operation of at least one device in a content delivery system may further include determining by the metadata processing subsystem a respective one of a number of actions to take based at least in part on an aspect of the subaudible tones, wherein at least one action specifies a downstream component to which at least some metadata is to be provided, the downstream component being upstream of a media player.

A content delivery system may be summarized as including a subaudible tone detection subsystem that monitors an audio channel for subaudible tones associated with respective ones of at least some of a plurality of media content segments on the audio channel; and a metadata processing subsystem that in response to at least some of the subaudible tones, causes at least one of a modification or an addition of metadata to a delivery of the media content segment associated with the respective subaudible tone.

The subaudible tone detection subsystem may monitor an audio only feed without any metadata for the subaudible tones, and the metadata processing subsystem may provide the metadata to be added. The subaudible tone detection subsystem may monitor a satellite feed of audio content which omits metadata. The subaudible tone detection subsystem may monitor the audio channel of a feed of video content. The subaudible tone detection subsystem may monitor an audio feed of the media content segments logically associated with respective existing metadata for the subaudible tones, and the metadata processing subsystem may provide respective new metadata to modify the existing metadata for the respective media content segments. The metadata which is modified or added may cause an advertisement injection system located relatively downstream of the at least one device to pass the respective content segment without modification of any attributes thereof. The subaudible tone detection subsystem may monitor audio for a subaudible tone of at least one defined duration and at least one defined frequency. The metadata processing subsystem may further identify at least one defined rule to apply based on at least one of the defined duration or the defined frequency of the subaudible tone in the audio. The metadata processing subsystem may further identify at least one piece of metadata for inclusion in the delivery of the respective one of the media content segments based on the identified at least one rule. The metadata processing subsystem may further cause a downstream component to include the identified at least one piece of metadata in the delivery of the respective one of the media content segments in response to the identified at least one rule. The metadata processing subsystem may cause an advertisement insertion component to include the identified at least one piece of metadata in the delivery of the respective one of the media content segment. The metadata processing subsystem may cause an encoder component to include the identified at least one piece of metadata in a streaming delivery of the respective one of the media content segments. The subaudible tone detection subsystem may receive metadata from an automation system, the received metadata for inclusion in the delivery of the respective media content segment, and the metadata processing subsystem may buffer the metadata received from the automation system, may determine whether a subaudible tone associated with the respective media content segment with a defined duration and a defined frequency is received within a defined duration of time; and in response to a determination that the subaudible tone of the defined duration and the defined frequency is not received within the defined duration of time, may cause the inclusion of the buffered metadata in a streaming delivery of the respective one of the media content segments.

The subaudible tone detection subsystem may receive metadata from an automation system, the received metadata for inclusion in the delivery of the respective media content segment, and the metadata processing subsystem may buffer the metadata received from the automation system, may determine whether a subaudible tone associated with the respective media content segment with a defined duration and a defined frequency is received within a defined duration of time; and in response to a determination that the subaudible tone of the defined duration and the defined frequency is received within the defined duration of time, may cause the inclusion of at least one modified piece of metadata in a streaming delivery of the respective one of the media content segments. The subaudible tone detection subsystem may receive the plurality of media content segments on the audio channel from at least one primary media source, and an encoder may encode at least some of the media content segments and at least some modified metadata for streaming delivery to an end user media content player. The metadata processing subsystem may determine a respective one of a number of actions to take based at least in part on an aspect of the subaudible tones, wherein at least one action may specify a downstream component to which at least some metadata is to be provided, the downstream component being upstream of a media player.

A method of operation of at least one device in a content delivery system may be summarized as including monitoring an audio channel by the at least one device for subaudible tones associated with respective ones of at least some of a plurality of media content segments; and in response to at least some of the subaudible tones, providing metadata by the at least one device to an advertisement injector that causes the advertisement injector to pass the respective media content segment without inserting other content in the respective media content segment.

Monitoring an audio channel for subaudible tones may include monitoring the audio channel of a feed of video content. Monitoring an audio channel for subaudible tones may include monitoring for a subaudible tone of at least one defined duration and at least one defined frequency.

The method of operation of at least one device in a content delivery system may further include identifying by the at least one device at least one defined rule to apply based on at least one of the defined duration or the defined frequency of the subaudible tone in the audio.

The method of operation of at least one device in a content delivery system may further include identifying by the at least one device at least one piece of substitute metadata for inclusion in the delivery of the respective one of the media content segments based on the identified at least one rule.

The method of operation of at least one device in a content delivery system may further include causing a downstream component to include the identified at least one piece of substitute metadata in the delivery of the respective one of the media content segments in response to the identified at least one rule.

Causing a downstream component to include the identified at least one piece of substitute metadata in the delivery of the respective one of the media content segments may include causing the downstream component to include the identified at least one piece of substitute metadata which uniquely identifies a content provider in the delivery of the respective one of the media content segments.

A content delivery system may be summarized as including a subaudible tone detection subsystem that monitors an audio channel for subaudible tones associated with respective ones of at least some of a plurality of media content segments; and a metadata processing subsystem that in response to at least some of the subaudible tones, provides metadata by the at least one device to an advertisement injector that causes the advertisement injector to pass the respective media content segment without inserting other content.

The metadata processing subsystem may monitor the audio channel of a feed of video content. The metadata processing subsystem may monitor for a subaudible tone of at least one defined duration and at least one defined frequency. The metadata processing subsystem may further identify at least one defined rule to apply based on at least one of the defined duration or the defined frequency of the subaudible tone in the audio. The metadata processing subsystem may further identify at least one piece of substitute metadata for inclusion in the delivery of the respective one of the media content segments based on the identified at least one rule. The metadata processing subsystem may further cause a downstream component to include the identified at least one piece of substitute metadata in the delivery of the respective one of the media content segments in response to the identified at least one rule. The identified at least one piece of substitute metadata may uniquely identify a content provider in the delivery of the respective one of the media content segments.

A method of operation of at least one device in a content delivery system may be summarized as including performing audio spectrum analysis of an audio channel for detection of subaudible tones associated with respective ones of at least some of a plurality of media content segments on the audio channel; for each of a number of defined frequencies at which subaudible tones are expected, performing instantaneous phase counting that counts transitions of at least one of amplitude or phase via an amplitude/phase transition counter; determining if a defined number of transitions occurred during a temporal window; and indicating that a subaudible tone has been detected in response to a determination that the defined number of transitions occurred during the temporal window.

Performing audio spectrum analysis of an audio channel may include performing a fast Fourier transform analysis with a sliding widow.

The method of operation of at least one device in a content delivery system may further include verifying that the detected subaudible tone is one of a number of defined audio tone signals.

The method of operation of at least one device in a content delivery system may further include determining whether a quiet zone is above a defined quiet zone threshold; and in response to a determination that the quiet zone is not above the defined quiet zone threshold, determining an action to take based on the detected subaudible tone and a rule logically associated with the detected subaudible tone.

The method of operation of at least one device in a content delivery system may further include determining whether a quiet zone is above a defined quiet zone threshold; and in response to a determination that the quiet zone is above the defined quiet zone threshold, discarding the detected subaudible tone.

The method of operation of at least one device in a content delivery system may further include selecting between a regular performance mode and a high performance mode.

The method of operation of at least one device in a content delivery system may, in a high performance mode, further include in a high performance mode performing a fast Fourier transform analysis with a sliding widow to perform the audio spectrum analysis of the audio channel.

A device in a content delivery system may be summarized as including an audio spectrum analyzer communicatively coupled to perform audio spectrum analysis of an audio channel to detect subaudible tones associated with respective ones of at least some of a plurality of media content segments on the audio channel; an amplitude/phase transition counter communicatively coupled to the audio spectrum analyzer and that, for each of a number of defined frequencies at which subaudible tones are expected, performs instantaneous phase counting that counts transitions of at least one of amplitude or phase; a processor communicatively coupled to the amplitude/phase transition counter, and which determines if a defined number of transitions occurred during a temporal window, and which produces an indication that a subaudible tone has been detected in response to a determination that the defined number of transitions occurred during the temporal window.

The audio spectrum analyzer may perform a fast Fourier transform analysis with a sliding widow. The processor may further verify that the detected subaudible tone is one of a number of defined audio tone signals. The processor may further determine whether a quiet zone is above a defined quiet zone threshold, and in response to a determination that the quiet zone is not above the defined quiet zone threshold, determine an action to take based on the detected subaudible tone and a rule logically associated with the detected subaudible tone. The processor may further determine whether a quiet zone is above a defined quiet zone threshold, and in response to a determination that the quiet zone is above the defined quiet zone threshold, discard the detected subaudible tone.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, broadcast systems including radio and television broadcast systems, as well as networks and other communications channels have not been shown or described in detail to avoid unnecessarily obscuring descriptions of the embodiments.

Unless the context requires otherwise, throughout the specification and claims which follow, the word "comprise"

and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Networked Environment Overview

Figure 1:
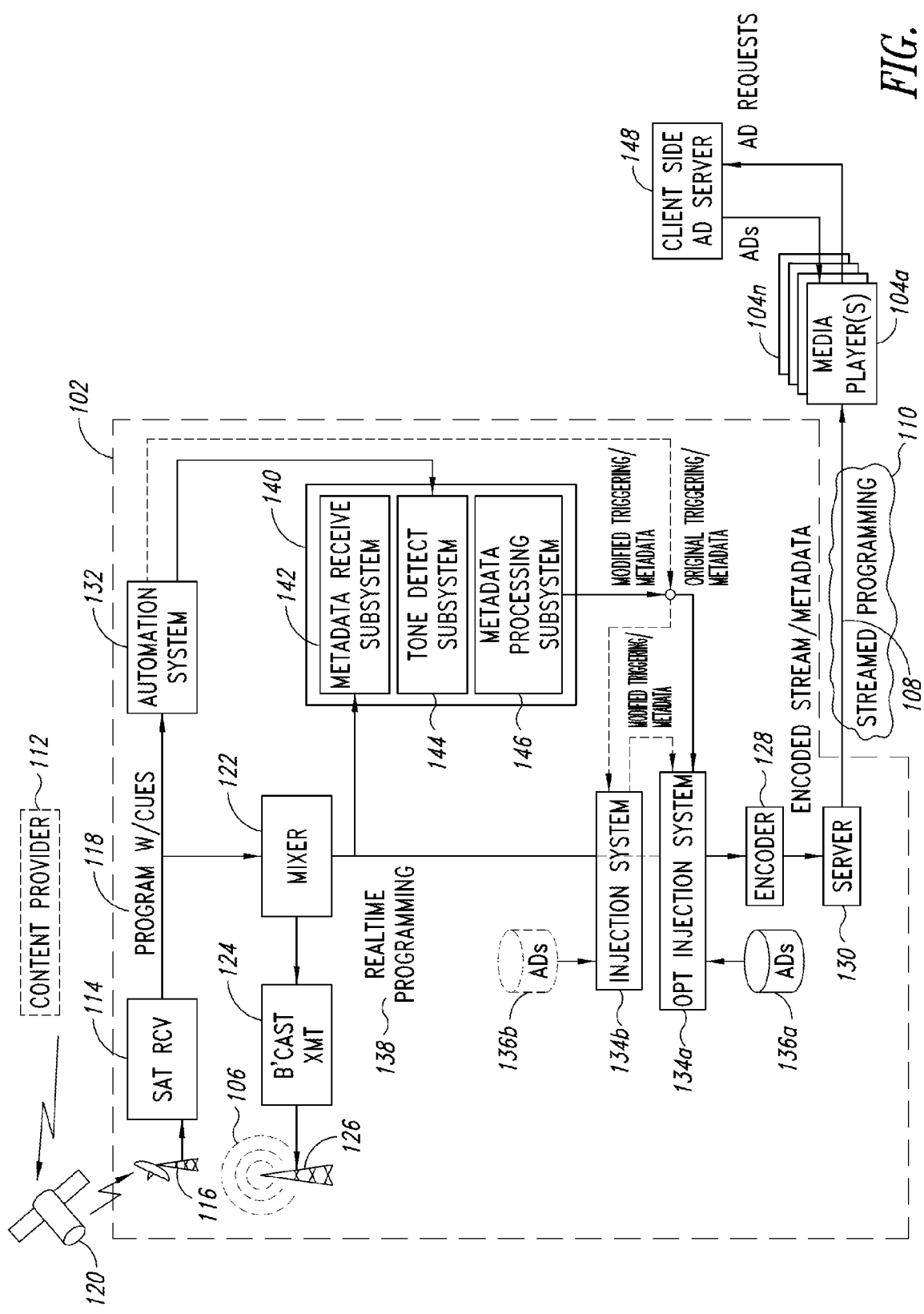
FIG. 1 is a schematic diagram of a content delivery environment, including a broadcaster (e.g., terrestrial radio or television broadcaster) facility which receives programming from a content provider, for instance via a satellite feed, and which provides programming both via broadcasting to a broadcast audience and via streaming to a streaming audience including associated content consumer devices or clients (e.g., computers, smartphones, tablets, Internet enabled televisions), according to one illustrated embodiment.

FIG. 1 shows a content delivery environment 100, according to one illustrated embodiment in which various apparatus, methods and articles described herein may operate.

The content delivery environment 100 includes a number of broadcasters (only one illustrated) represented as broken line box 102, a broadcast audience (not shown), and a number of end users or content consumers, referred to herein as media players 104a-104n (four illustrated, two called out, collectively 104).

The broadcaster 102 broadcasts 106 programming to the broadcast audience (not shown). The broadcaster 102 may additionally provide an alternative feed of programming, for example via a communications network. For example, the broadcaster 102 may provide a streaming feed 108 of some portion or all of the broadcast programming via a network such as the Internet 110 or a Worldwide Web portion of the Internet 110, for instance using packet switching protocols (e.g., TCP/IP).

The broadcaster 102 may take a variety of forms, for example, radio stations or radio broadcasters, television stations or television broadcasters, other terrestrial or satellite broadcasters, etc. The broadcaster 102 may, or may not, own the content that they provide. Many broadcasters 102 earn revenue by selling blocks of advertising time or impressions. The broadcaster 102 may, or may not, provide free public service announcements. Many broadcasters 102 would commercially benefit from a robust market for blocks of advertising time or impressions.

The broadcaster 102 may receive content from one or more content providers 112. For example, the broadcaster 102 may have one or more satellite receivers 114 (only one shown) and associated antenna(s) 116 (only one shown) to receive a satellite feed 118 of content from the content provider(s) 112 via one or more satellites 120 (only one shown). The satellite feed of programming 118 may include media content, advertising content, metadata, and optionally other content.

Terrestrial broadcast programming typically includes a plurality of content segments. Some of the content segments are identified or identifiable as replaceable, while others are not replaceable. For example, local advertisement content may be identified as replaceable with the primary subject matter or content or programming of the broadcast may be identified as non-replaceable. Such may be identified in metadata which may, or may not, be part of the content or programming.

The broadcaster 102 will typically include a source of programming, for example, one or more sound boards for a radio broadcaster or video boards for a television broadcaster. These sources of programming are referred to collectively herein as a mixer 122. The broadcaster 102 will typically include one or more transmitters 124 and associated antenna(s) 126 to wirelessly transmit programming. Various types of transmitters 124 and antennas 126 may be suitable. For example, commercially available transmitters and antennas for amplitude modulated (AM) or frequency modulated (FM) radio, or for analog (e.g., NTSC standard) or digital (e.g., ATSC standard) television broadcasts, or other forms of wireless broadcast communications. Typically, additional circuitry (not shown) is present to filter and otherwise condition or process the signals. Broadcasters 102 often employ transponders or repeaters (neither shown) to extend the range or coverage of their service area. In any case, a geographic range of the broadcast 106 of the programming is typically limited.

The broadcaster 102 may enjoy virtually unlimited range by providing the alternative feed of programming 108. To achieve such, the broadcaster 102 may employ one or more encoders 128 (only one shown) and/or one or more server computer systems 130 (only one shown).

The encoder(s) 128 may take the form of fragment encoder system(s) that encodes content, including original content from the broadcast into fragments suitable for storage, retrieval and playing on media players 104. The encoder(s) 128 encodes whatever material is provided to the encoder 128.

When employed, the server computer system(s) 130 streams, Webcasts or otherwise serves the encoded content to media player(s) 104. The server computer system(s) 130 may employ any variety of conventional content streaming techniques. Where server computer system(s) 130 are omitted, the encoder(s) 128 transmits the encoded content fragments to the media players 104.

In some implementations, the encoder(s) 128 and/or server computer system(s) 130 may transmit the alternative programming 108 to various network locations, for instance for temporary storage. For example, the encoder(s) 128 or server computer system(s) 130 may transmit encoded content fragments to various content delivery networks (CDNs) (not shown) for storage, for instance via the private network infrastructure (not shown). Such allows media players 104 to retrieve the encoded content fragments, for example according to a dynamically generated manifest via a public network infrastructure such as the Worldwide Web portion of the Internet 110.

The CDNs (not shown) facilitate delivery of programming, accounting for temporal demand for the programming and geographic distribution of the demand. The CDNs (not shown) may take the form of various networks of server computer systems and associated nontransitory storage media, typically geographically distributed to allow caching of content, including alternative programming 108 content, and associated information. Such may be accessible by media clients 104 via a public network infrastructure, for instance the Internet 110 or Worldwide Web of the Internet 110.

Many broadcasters 102 employ one or more automation systems 132 and/or injection systems 134a, 134b (collectively 134) to modify programming 118 intended for broadcast to render such more suitable for the delivery as alternative programming 108, for example for delivery via streaming.

The automation system 132 may identify segments of the programming 118 intended for the broadcast which are candidates for replacement in the alternative programming 108. For example, it may be desirable to modify the broadcast programming 118 since the audience for the alternative programming 108 may be more geographically diverse than the broadcast audience (not shown). For instance, commercials or advertisements which may be relevant to a broadcast audience (not shown) may not be particularly relevant for a more geographically diverse streaming audience (e.g., media players 104) due to the local nature of the advertisement or advertiser's location. Also for example, the audience for the alternative programming 108 may be demographically more diverse with respect to broadcast audience (not shown). For instance, audience members who receive programming via streaming may be younger or more technically inclined than a radio or even a television broadcast audience (not shown), and thus may have different interests.

The automation system 132 may detect markers which mark a start and/or end of programming segments, for instance the start of an advertising break or a start of a return to the standard media content programming material (i.e., the subject of the broadcast, such as music, news, talk, sports). The injection system 134a may inject (i.e., add or substitute) alternative content to create the alternative programming 108. For example, the automation system 132 may indicate one or more advertisements for inclusion in the alternative programming 108, for instance in place of advertisements in the programming 118 intended for the broadcast. In particular, the automation system 132 may identify advertisements more suitable for a streaming audience (e.g., media players 104) than the advertisements in the original programming 118 which are more suitable for a broadcast audience (not shown). In response, the injection system 134a may inject the identified advertisements in the programming material, for instance in place of other advertisements. The advertisements may reside or be stored in a database on one or more nontransitory computer- or processor-readable media 136a.

The automation system 132 may employ other techniques for identifying replaceable content from nonreplaceable content. In some implementations, the injection system(s) 134 may identify the replacement material (e.g., replacement advertisements or advertising content). Such may be selected based on general demographic information about the likely audience for the alternative programming 108. Some implementations may omit the automation system 132, while other implementations may omit the injection system(s) 134. While illustrated as co-located with the other equipment of the broadcaster 102, the automation system 132 and/or injection system(s) 134 may be located remotely from the broadcaster 102. Further, the automation system 132 and/or injection system 134a may be owned and/or operated by an entity other than the broadcaster 102.

In particular, a first injection system 134a is coupled to receive programming 138 from the mixer (e.g., sound board, video board) 122. The first injection system 134a may also optionally be communicatively coupled to receive alternative content material to be inserted or substituted in the programming 118, for example, alternative advertisements. For instance, the first injection system 134a may be communicatively coupled to a store of alternative content, for example database on one or more first nontransitory computer- or processor-readable media 136a. Alternatively, the first injection system 134a may be communicatively coupled to an alternative content manager and/or portal systems (not shown) to receive alternative content or information indicative of a location from which the alternative content or fragments thereof may be retrieved. The alternative content or material to be inserted may, for example, take the form of placed advertisements (e.g., preroll advertisements which appear before a video or FLASH® player clip, banner advertisements).

A primary function of the first injection system 134a is to detect content or content segments of replaceable content or material in the broadcast programming. An optional function of the first injection system 134a is to insert or substitute alternative content or material in a stream or sequence or program of the content. For example, inserting alternative content segments in a sequence of defined segments or blocks of the programming material, for instance, in advertisement segments or blocks, in place of or as a substitute for advertisements in the broadcast programming. Such may, for example, allow replacement of material that is of local interest with material that is more appropriate for a wider audience or even more appropriate for a more specific audience, and/or replacement of material that generates lower revenue with material that generates higher revenue. In some implementations, the first injection system 134a may insert location information that indicates a location (e.g., logical network address) at which alternative content fragments may be retrieved.

Optionally, a second injection system 134b may be communicatively coupled between the first injection system 136a and the mixer 122 to receive programming from the mixer (e.g., sound board, video board) 122. and optionally pass programming. The second injection system 134b may also optionally be communicatively coupled to receive alternative content material to be inserted or substituted in the programming 118, for example, alternative advertisements. For instance, the second injection system 134b may be communicatively coupled to a store of alternative content, for example database on one or more first nontransitory computer- or processor-readable media 136b. Alternatively, the second injection system 134b may be communicatively coupled to an alternative content manager and/or portal systems (not shown) to receive alternative content or information indicative of a location from which the alternative content or fragments thereof may be retrieved. The alternative content or material to be inserted may, for example, take the form of placed advertisements (e.g., preroll advertisements which appear before a video or FLASH® player clip, banner advertisements).

A primary function of the second injection system 134b is to insert or substitute alternative content or material in a stream or sequence or program of the content in some instances where the first injection system 134a is bypassed (i.e., instructed not to inject or insert alternative content or material in a stream or sequence or program of the content). This may be particularly useful where, for example, client side injection or insertion is not available or is not desirable.

As explained in more detail herein, the injection system(s) 134 may use buffering to allow the replacement material to, in some instances, fit within a content segment or block, or in other instances, overlap or partially overlap the content segment or block. The injection system(s) 134 may attempt to maintain the streaming of modified programming approximately concurrent with the broadcast, reducing delay or lag therebetween. The injection system(s) 134 provide the programming, with the inserted alternative material, to the encoder 128.

The injector system(s) 134 may be similar, or even identical, in structure and/or operation to the content injection system described in U.S. patent application publication No. 2008/0120638 published May 22, 2008 or U.S. patent application Ser. No. 61/561,186 filed Nov. 17, 2011. That content injection system advantageously employs selective buffering or caching so that replacement material does not need to be exactly the same length or duration as the material being replaced. Additionally, or alternatively, the injector system(s) 134 may in some respects be similar or identical in structure and/or operation to that described in U.S. patent application publication No. 2007/0074243. Additionally, or alternatively, the injection system(s) 134 may in some respects be similar or identical in structure and/or operation to that described in U.S. Pat. No. 6,577,716.

The content delivery environment 100 advantageously employs a metadata tunnel system 140*a* which may intervene between, for example the automation system 132 and the advertisement injection system 134*a* and/or the encoder 128. The metadata tunnel system 140 may advantageously modify or add metadata. The metadata tunnel system 140 may advantageously allow desired segments of content to pass (i.e., bypass) the first injection system 136*a* unhindered. The metadata tunnel system 140 may allow metadata to be incorporated that allows an identity of the content provider to be ascertained, even far downstream (e.g., media players 104) in the content delivery environment 100.

As illustrated in FIG. 1, the metadata tunnel system 140 may include one or more metadata receive subsystem(s) 142, subaudible tone detection subsystem(s) 144 and/or metadata processing subsystem(s) 146.

The metadata receive subsystem 144 is communicatively coupled to receive metadata, for example metadata that is part of original programming intended for broadcast. The metadata receive subsystem 144 may include one or more communications ports (e.g., wired or wireless) and one or more buffers to buffer received metadata.

The subaudible tone detection subsystem 144 detects subaudible tones incorporated into the programming content segments by the content provider(s) 112. The subaudible tones are contained in an audio channel of the programming, whether audio programming or video programming. When played via a sound transducer (e.g., speaker), the subaudible tones are typically detectable within the normal or typical range of human hearing. For example, the subaudible tones may be at defined frequencies which are outside the range of frequencies (e.g., 30 Hz-20 KHz) which humans hear. Additionally or alternatively, the subaudible tones may be sufficiently short so as to not be detectable by normal human hearing. In any case, the subaudible tones are of defined frequencies and defined duration(s) sufficiently long to be detected using various electrical and electronic equipment and techniques, some of which equipment and techniques are described herein.

The metadata processing subsystem 146 determines which actions to take in response to detection of subaudible tones, and executes or causes execution of the determined actions. For example, each of a number of subaudible tones may map to, be correlated or associated with, or otherwise indicate or identify one or more respective rules or sets of instructions. Thus, a subaudible tone of a first frequency may indicate a first rule(s) or first set of instructions, while a second frequency may indicate a second rule(s) or second set of instructions to carry out. In some implementations, the duration of the subaudible tone may indicate the particular rule(s) or set(s) of instructions. In yet other implementations, a combination of the frequency and duration of the subaudible tone may indicate the rule(s) or set(s) of instructions. The number of rules or sets of instructions is virtually unlimited, as are the number of defined frequencies and/or defined durations for subaudible tones.

Based on the identified rule(s) or set(s) of instructions, the metadata processing subsystem 146 may cause the first injection system 134*a* to pass (i.e., bypass) a programming content segment unmodified, or alternatively to inject or insert a programming segment for instance substituting a replacement advertisement segment for a replaceable advertisement segment in the broadcast intended programming 118 to create the alternative programming 108.

Based on the identified rule(s) or set(s) of instructions, the metadata processing subsystem 146 may identify new metadata for inclusion or addition to the broadcast intended programming 118 to create the alternative programming 108.

Based on the identified rule(s) or set(s) of instructions, the metadata processing subsystem 146 may identify new metadata which specifies an identity of a content provider 112 that provided the content of the programming 118, for inclusion or addition in the alternative programming 108, allowing later downstream identification of the particular content provider 112.

Based on the identified rule(s) or set(s) of instructions, the metadata processing subsystem 146 may provide new metadata for a programming segment where no metadata exists. Based on the identified rule(s) or set(s) of instructions, the metadata processing subsystem 146 may provide modify existing metadata of a programming segment. Based on the identified rule(s) or set(s) of instructions, the metadata processing subsystem 146 may provide add metadata to a programming segment, where some metadata already exists.

The subaudible tone detection subsystem 144 and metadata processing subsystem 146 are discussed in more detail below, in reference to FIG. 2.

Optionally, the content delivery environment 100 may include a number of client side advertisement servers 148, from which the media players 104 may retrieve advertisements in response to metadata in streamed programming 108. Communications between the media players 104 and the client side advertisement servers 148 may be via any conventional communications network, for instance the Internet or Worldwide Web portion of the Internet.

Advertisements stored in the database on one or more nontransitory computer- or processor-readable media 140 may, for example, come from one or more advertiser networks (not shown) which generally are entities that connect advertisers with Websites or other content providers which wish to host advertisements. Advertiser networks (not shown) typically aggregate advertisement opportunities, commonly referred to as "advertising space" from various content providers (e.g., television or radio stations, Webcasters), and match the advertisement opportunities with advertiser demands. "Online" advertisement networks typically employ a central advertisement server to deliver advertisements to content consumers. Such allows targeting of advertisements to content consumers based on demographics, as well as tracking of responses to advertisements and the reporting of impressions.

The advertisers (not shown) are generally the source of advertising content, or other alternative content, to be inserted in a stream or flow of media (e.g., radio broadcast, television broadcast, Webcast). The advertisers (not shown) may be the subject of the advertising content, for instance, a company or other entity which the advertisement is about or advertises. Alternatively, the advertisers (not shown) may be an originator or creator of the advertisement or otherwise entrusted with placing advertising by the subject of the advertisement (e.g., advertising agency).

Media players 104 may take the form of any of a large variety of devices. For example, media players 104 may take the form of personal computers such as desktop computers, laptop computers, or netbooks. Also, for example, media players 104 may take the form of mobile devices, such as smart phones, tablet computer devices, personal digital assistants (PDAs). Also, for example, media players 104 may take the form of televisions, for example Internet or Web enabled televisions or peripherals such as video players, DVD players, Blu-Ray players, digital video recorders (DVRs), "set top" boxes or streaming media devices (e.g., Apple® TV, Roku®, PlayStation 3®).

Detailed View of Particular Components

Figure 2:
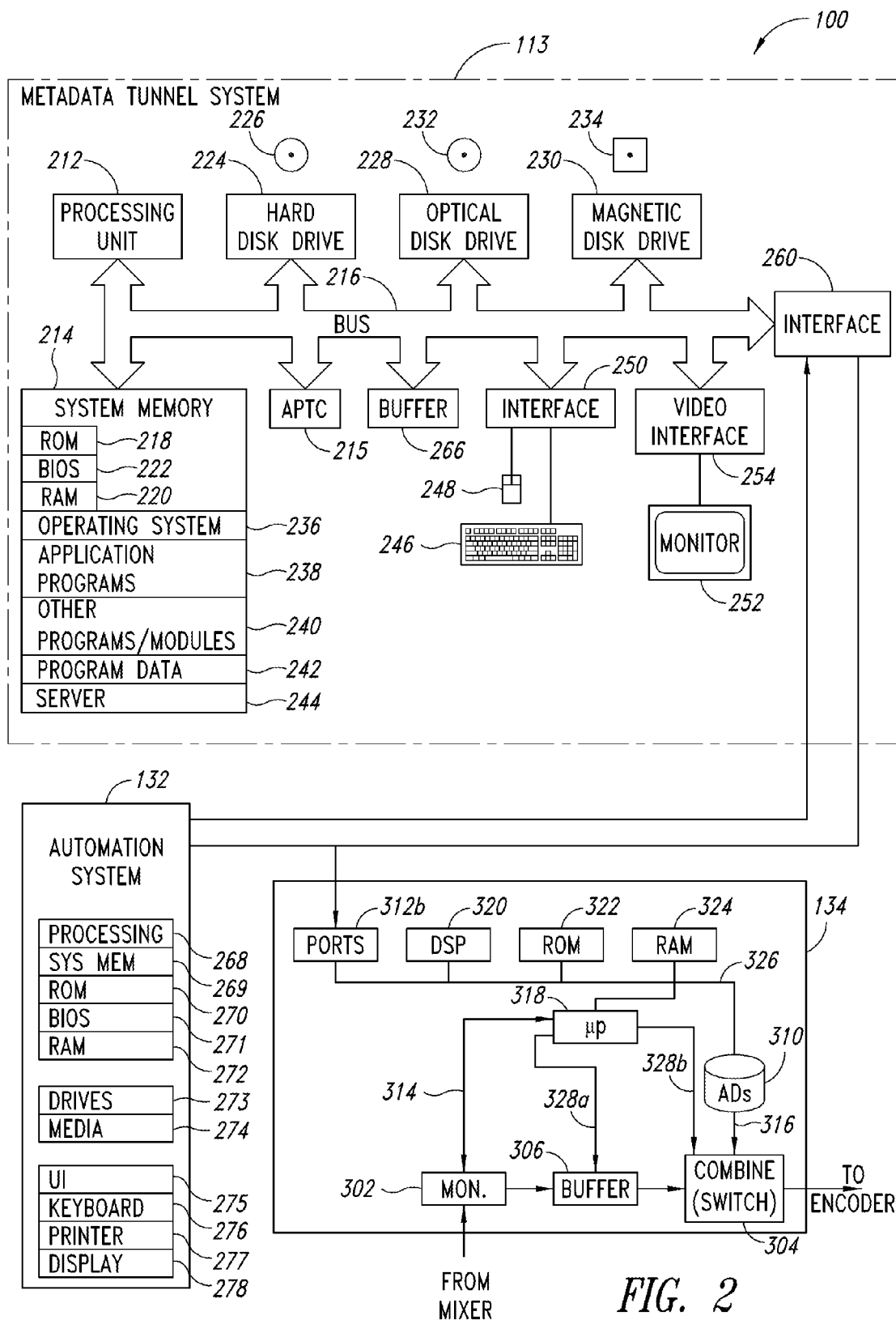
FIG. 2 is a schematic diagram of shows a portion of the networked environment of FIG. 1 in more detail, the networked environment including an automation system, injection system and a metadata tunnel system, according to one illustrated embodiment.

FIG. 2 shows a portion of the networked environment 100 comprising an automation system 132, first injection system 134a and a metadata tunnel system 140, according to one illustrated embodiment. FIG. 2 provides a more detailed representation of some of the components of FIG. 1. The metadata tunnel system 140 will be discussed first, followed by a brief discussion of the automation system 132 and the first injection system 134a.

The metadata tunnel system 140 will at times be referred to in the singular herein, but this is not intended to limit the embodiments to a single device or system since in some embodiments, there may be more than one metadata tunnel system 140. Unless described otherwise, the construction and operation of the various blocks shown in FIG. 2 are of conventional design. As a result, such blocks need not be described in further detail herein, as they will be understood by those skilled in the relevant art.

The metadata tunnel system 140 may include one or more processing units 212 (one illustrated), nontransitory system memories 214 and a system bus 216 that couples various system components including the system memory 214 to the processing unit(s) 212. The processing unit(s) 212 may be any logic processing unit, such as one or more central processing units (CPUs), digital signal processors (DSPs), application-specific integrated circuits (ASICs), field programmable gate arrays (FPGAs), programmable logic controllers (PLCs), etc. The metadata tunnel system 140 may also include a component or module that detects or is used in detecting predefined subaudible tones, for example an amplitude/phase transition counter (APTC) 215. The metadata tunnel system 140 may also include a buffer 266 to buffer metadata, for example metadata received from the automation system 132. The system bus 216 can employ any known bus structures or architectures, including a memory bus with memory controller, a peripheral bus, and a local bus. The system memory 214 includes nontransitory read-only memory ("ROM") 218 and nontransitory random access memory ("RAM") 220. A basic input/output system ("BIOS") 222, which can form part of the ROM 218, contains basic routines that help transfer information between elements within the advertising network server computer system 112, such as during start-up.

The metadata tunnel system 140 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD/DVD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program engines and other data for the metadata tunnel system 140. Although the depicted metadata tunnel system 140 is illustrated employing a hard disk 224, optical disk 228 and magnetic disk 230, those skilled in the relevant art will appreciate that other types of metadata tunnel system 140 computer- or processor-readable storage media that can store data accessible by a computer may be employed, such as magnetic cassettes, flash memory, digital video disks ("DVD"), Bernoulli cartridges, RAMs, ROMs, smart cards, etc. The hard disk 226 may, for example, store advertising content inventory and related information and/or advertising placement opportunity inventory and related information.

Program engines can be stored in the system memory 214, such as an operating system 236, one or more application programs 238, other programs or engines 240 and program data 242. Application programs 238 may include instructions that cause the processor(s) 212 to automatically detect subaudible tones in programming, determine whether the detected subaudible tones correspondence to defined parameters (e.g., frequency, duration), determine an action or actions to take in response to detected defined subaudible tones, and selectively generate and/or supply metadata in response to detection of at least some defined sub audible tones in the programming. Application programs 238 may include instructions that cause the processor(s) 212 to automatically generate or supply metadata in response to detection of at least some defined sub audible tones in the programming. Application programs 238 may include instructions that cause the processor(s) 212 to automatically identify respective rules or sets of instructions responsive to the detection of subaudible tones, for example based on one or more characteristics or aspects (e.g., frequency, duration) of the subaudible tones. Such characteristics or aspects and/or rules or sets of instructions may be user specified and stored as configuration information in one of the nontransitory computer- or processor-readable media.

Other program engines 240 may include instructions for handling security such as password or other access protection and communications encryption. The system memory 214 may also include communications programs, for example, a server 244 for permitting the metadata tunnel system 140 to provide services and exchange data with other computer systems or devices via the Internet, corporate intranets, extranets, or other networks (e.g., LANs, WANs), as well as other server applications on server computing systems such as those discussed further herein. The server 244 in the depicted embodiment may be markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers are commercially available such as those from Microsoft, Oracle, IBM and Apple.

While shown in FIG. 2 as being stored in the system memory 214, the operating system 236, application programs 238, other programs/engines 240, program data 242 and server 244 can be stored on the hard disk 226 of the hard disk drive 224, the optical disk 232 of the optical disk drive 228 and/or the magnetic disk 234 of the magnetic disk drive 230.

An operator can enter commands and information (e.g., configuration information, data or specifications) into the metadata tunnel system 140 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The metadata tunnel system 140 can include other output devices, such as speakers, printers, etc.

The metadata tunnel system 140 can operate in a networked environment using logical connections to one or more remote computers and/or devices as described above with reference to FIG. 1. For example, the metadata tunnel system 140 can operate in a networked environment using logical connections to one or more automation systems 132, one or more injection systems 134a, and/or encoders 128 (FIG. 1). Communications may be via a wired and/or wireless network architecture, for instance, wired and wireless enterprise-wide computer networks, intranets, extranets, and the Internet. Other embodiments may include other types of communication networks including telecommunications networks, cellular networks, paging networks, and other mobile networks.

The automation system 132 may take the form of a conventional mainframe computer, mini-computer, workstation computer, personal computer (desktop or laptop), or handheld computer. The automation system 132 may include a processing unit 268, a nontransitory system memory 269 and a system bus (not shown) that couples various system components including the system memory 269 to the processing unit 268. The automation system 132 will at times be referred to in the singular herein, but this is not intended to limit the embodiments to a single automation system 132 since in some embodiments, there may be more than automation system 132 or other device involved. Non-limiting examples of commercially available computer systems include, but are not limited to, an 80x86, Pentium, or i7 series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the automation system 132 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes nontransitory read-only memory ("ROM") 270 and nontransitory random access memory ("RAM") 272. A basic input/output system ("BIOS") 271, which can form part of the ROM 270, contains basic routines that help transfer information between elements within the sending client computer system 114a, such as during start-up.

The automation system 132 may also include one or more media drives 273 (e.g., a hard disk drive, magnetic disk drive, and/or optical disk drive) for reading from and writing to nontransitory computer- or processor-readable storage media 274 (e.g., hard disk, optical disks, and/or magnetic disks). The nontransitory computer- or processor-readable storage media 274 may, for example, take the form of removable media. For example, hard disks may take the form of a Winchester drives, optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer- or processor-readable storage media 274, provide nonvolatile storage of computer readable instructions, data structures, program engines and other data for the automation system 132. Although described as employing computer- or processor-readable storage media 274 such as hard disks, optical disks and magnetic disks, those skilled in the relevant art will appreciate that alternative automation system 132 may employ other types of computer-readable storage media that can store data accessible by a computer, such as magnetic cassettes, flash memory cards, digital video disks ("DVD"), Bernoulli cartridges, RAMs, ROMs, smart cards, etc. Data or information, for example, configuration information, advertisement related information, demographic information, revenue information, etc., can be stored in the computer- or processor-readable storage media 274.

Program engines, such as an operating system, one or more application programs, other programs or engines and program data, can be stored in the system memory 269. Program engines may include instructions to select alternative or replacement content to replace content identified as replaceable in metadata associated with the content and/or provide triggers and/or metadata to the metadata tunnel system 140 and/or to the injection system 134a, as illustrated by arrows in FIG. 2. In particular, the instructions may cause selection of alternative or replacement content based on a variety of criteria including a current geographic location or approximate current geographical location of a content consumer media player 104 (FIG. 1).

Program engines may include instructions for handling security such as password or other access protection and communications encryption. The system memory 269 may also include communications programs, for example, a Web client or browser that permits the automation system 132 to access and exchange data with sources such as Web sites of the Internet, corporate intranets, extranets, or other networks as described below, as well as other server applications on server computing systems such as those discussed further below. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/engines, program data and/or browser can be stored on the nontransitory computer- or processor-readable storage media 274 of the media drive(s) 273. An operator can enter commands and information via a user interface 275 through input devices such as a touch screen or keyboard 276 and/or a pointing device 277 such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The automation system 132 can include other output devices, such as speakers, printers, etc.

The first injection system 134a includes a monitor 302 to detect the occurrence of markers or meta data in the programming and a combiner 304 operable to selective combine portions of the broadcast or Webcast programming 112 (FIG. 1) with new or replacement content. The first injection system 134a may also include a buffer 306, a control subsystem (not called out separately), and an advertisement storing nontransitory computer- or processor-readable medium 310, each directly or indirectly communicatively coupled with the monitor 302 and combiner 304. As explained in more detail below, the buffer 306 is communicatively coupled, configured and/or controlled to temporarily buffer or store broadcast or Webcast programming content and selectively release, deliver or unbuffer the programming content on occurrence of certain conditions. The control subsystem is communicatively coupled and configured to control the operation of the first injection system 134a, including the various components thereof. The nontransitory computer- or processor-readable medium 310 stores new or replacement programming content segments and/or new or replacement non-programming content segments for use in combining with portions of the broadcast to alternative (e.g., streaming) programming 108 (FIG. 1).

The first injection system 134a is communicatively coupled to receive real-time programming from a mixer 122 (FIG. 1) of a broadcaster 102. For example, the first injection system 134a may be communicatively coupled to receive an audio feed (e.g., digital or analog) from a sound board of a radio broadcaster or a video feed from a video board of a television broadcaster. Notable, as illustrated in FIG. 1, a second injection system 134b may optionally be inserted in between the mixer 122 and the first injection system 134a. Such may allow substitution of desired content, different from the content which the first injection system 134a would inject, for example where a client side advertisement server 148 is not available or otherwise not desirable.

A communications port 312 permits the receipt of new or modified metadata from the metadata tunnel system 140. A communications port 312 optionally permits the receipt of metadata from the automation system 132, for instance in unmodified form. An optional communications port 312 permits the receipt of new or replacement programming content segments and/or new or replacement non-programming content segments from an external source, for example from an external advertiser, external advertising marketplace, external replacement programming content provider and the like. An optional communications port 312 allows receipt of commands, instructions, data, and programming. For example, various types of selection criterion may be received via communications port 312. While one set of communications ports 312 are illustrated, the first injection system 134a may include fewer or greater number of ports 312.

As noted above, a primary function of the first injection system 134a is to detect meta data or markers, for example rejoin markers. As described above, the meta data or markers signify the beginning and/or ending of the different content segments. The beginning and ending of at least certain content segments are conditions that may wholly or partially control an operational state of the combiner 304, and optionally of the buffer 306. The occurrence of such may, for example, satisfy one condition for triggering the replacement of replaceable programming content segments (e.g., advertisements) with replacement programming to generate or create the alternative programming 108. The occurrence of such may, for example, satisfy one condition for triggering the replacement of replaceable non-programming content segments with new or replacement non-programming content segments to generate or create the alternative programming 108. In either situation, a second condition may need to be satisfied, that is that a current content segment be completed before switching between the broadcast or Webcast and some repository of new or replacement content. Such, for example, triggers the creation of a plurality of alternative programming 108, each containing new or replacement programming content segments selected.

In some implementations, the monitor 302 detects markers or similar indicators designating a transition in programming content. The monitor 302 may, for example, detect the start or end of replaceable programming or replaceable non-programming content segments in the originating broadcast programming 118. The monitor 302 may, for example, detect the start or end of replaceable programming content segments, for instance, media content such as entertainment content (e.g., songs or block of songs) in the originating broadcast programming 118. Many types of broadcast programming 118 include such markers or other indicators to designate the start and/or end of certain segments. In some instances, the markers or other indicators simply mark the occurrence of the start or end of a segment. In other instances, the markers or other indicators include information or data about the respective content segment. For example, a start marker or other indicator may include information that specifies a duration of the subsequent content segment. The markers or other indicators may additionally or alternatively include other information. The monitor 302 scans the broadcast or 118 for markers or other indicators and produces an output or signals on a signal line 314 in response to detection of the same. The monitor 302 may also extract any information or data included in, or with, the marker or indicator, for instance, an indication of the duration of the subsequent segment, providing such to the control subsystem, for example via signal line 314.

The buffer 306 is downstream from the monitor 302 and may buffer original broadcast programming 118 when necessary or desirable. For example, such may allow time-shifting of content segments contained in the originating broadcast programming 118, which may increase flexibility of the injector system 134a. For example, where a duration of new or replacement programming or non-programming content segments either individually or cumulatively match a duration of the replaceable programming or non-programming content segments that they are to replace, the duration of the original broadcast programming 118 stored by the buffer 306 may remain constant or not change. Where the duration of new or replacement programming or non-programming content segments either individually or cumulatively exceed a duration of the replaceable programming or non-programming content segments that they are to replace, the original broadcast programming 118 stored by the buffer 306 may grow or increase. Where a duration of new or replacement programming or non-programming content segments is less than a duration of the corresponding replaceable programming or non-programming content segments either individually or cumulatively that they are to replace, the broadcast programming stored by the buffer 306 may shrink or be reduced. Notably, while the contents of the buffered may be played out during non-replaceable content segments of the broadcast, the contents of the buffer 306 is reduced by playing buffered content from the buffer during replaceable content segments since there is no simultaneous storing to the buffer 306 during these periods. The buffer 306 may function as a queue, receiving new content segments at one end of the queue, while playing previously received content segments from the other end of the queue. The buffer 306 may advantageously allow selection of new or replacement programming and non-programming content segments having durations without particular regard to trying to match a duration of the replaceable programming and non-programming content segments that they are to replace.

The duration of any asynchronicity between the originating broadcast programming 118 and the alternative (e.g., streamed) programming 108 may be permitted to "float"—in other words, the selection of replacement programming and non-programming segments may be performed without specific regard to the duration of the new or replacement programming or non-programming segments or the duration of the replaceable programming or non-programming segments being replaced. In at least some implementations, new or replacement programming and non-programming content segments are not selected until meta data is received and/or a marker is detected by the monitor 302. Upon detection by the monitor 302 of certain markers indicative of a start of a non-replaceable content segment in the broadcast 118, buffering of the non-replaceable originating broadcast programming 118 to the buffer 306 can be started. Upon detection by the monitor 302 of certain markers indicative of an end of a non-replaceable content segment (e.g., programming content, non-programming content) in the broadcast programming 118, delivery of a current new or replacement content segment to the combiner 304 may be allowed to finish, then the buffered content may be delivered from the buffer 306 to the combiner 304.

The combiner 304, also sometimes referred to as an alternative content inserter, is coupled downstream of the buffer 306. The combiner 304 selectively combines portions of the broadcast programming 118 (e.g., non-replaceable content segment) with new or replacement programming and non-programming content segments to generate, create or otherwise produce the alternative programming 108. For example, the combiner 304 may combine material from the new or replacement programming and non-programming content segment inventory 310 with non-replaceable programming and non-programming content segments of the originating broadcast programming 118. For instance, replaceable programming content segments (e.g., songs or blocks of songs) appearing in the originating broadcast programming 118 may be replaced with replacement programming content segments (e.g., songs or music selected based at least in part on mediacast content consumer specifications). In some instances, the new or replacement programming and non-programming content segments may be targeted or personalized for a particular consumer associated with a media player 104. In some instances, the new or replacement non-programming content may be more appropriate for wider audience than the replaceable non-programming content in the broadcast which is being replaced. In some instances, the new or replacement non-programming content may be targeted to a specific content consumer or audience than the replaceable non-programming content in the broadcast which is being replaced. Thus, the alternative programming 108 transmitted, for instance via the Worldwide Web, may be more personalized for the specific mediacast content consumer as compared to the broadcast programming 118 which is transmitted via conventional radio or television broadcasts.

The combiner 304 can take a variety of forms, as simple as a switch that selectively couples a downstream component or output of the first injection system 134a alternatively between a first input signal line 314 (e.g., from buffer 306) that carries the originating broadcast programming 118 and a second input 316 such as the insertion material inventory 310 that carries the replacement programming and non-programming content segments.

The control subsystem may take a variety of forms. Typically, the control subsystem will include one or more controllers, for example, microprocessors 318, DSPs 320, ASICs, PGAs, microcontrollers or the like. The control subsystem will also typically include one or more nontransitory nonvolatile memories such as ROM or FLASH memory 322 and/or one or more volatile memories such as RAM 324. One or more communications ports 312, for example, parallel communications ports (e.g., Ethernet port) or serial communications ports (e.g., Universal Serial Bus ports) may be considered part of the control subsystem or may be considered separate therefrom. The one or more communications ports 312 may allow wired and/or wireless communications with an alternative source of replacement programming and non-programming content segments. The one or more communications ports 312 may allow wired and/or wireless communications to receive instructions, commands, data or programming (e.g., firmware upgrades).

The various components of the control subsystem may be coupled via one or more buses 326 (only one shown), for example, one or more power buses, communications buses, instruction buses, address buses, data buses, etc.

The control subsystem is configured or programmed to control the operation of the first injection system 134a. The control subsystem is communicatively coupled to receive via signal line 314 one or more signals or data packets upon detection of a marker or other indicator by the monitor 302. The one or more signals or data packets may be indicative of the start, end, duration, or any combination thereof of a replaceable programming content segment, replaceable non-programming content segment, or non-replaceable programming content segment in the broadcast programming 118. The one or more signals or data packets may also be indicative of other information, for instance, the type of content segment, content of the content segment, format of the content segment or language of the content segment.

The control subsystem is communicatively coupled to receive metadata from the metadata tunnel system 140, and optionally from the automation system 132 in implementations in which an automation system is used, and optionally via the second injection system 134b in implementations in which a second injection system 134b is used. The control subsystem is responsive to the received metadata. For example, when no modified or new metadata is received from the metadata tunnel system 140, the control subsystem may cause injection or insertion of replacement content segments into the content of the original programming 118 to create the alternative (e.g., streaming) programming 108. In other instances, when certain modified or new metadata is received from the metadata tunnel system 140, the control subsystem may pass the corresponding content segment of the original broadcast programming 118 to create the alternative (e.g., streaming) programming 108. Thus, the metadata tunnel system 140 may in a sense spoof the first injection system 134a to allow advertisements or metadata provided by a content provider 112 to pass without replacement. In some embodiments, the metadata tunnel system 140 may cause the optional second injection system 134b to inject content to create modified programming. The second i injection system 134b passes the modified programming to the first injection system 134a, which is controlled to allow the modified program to pass to the encoder 128 in response to modified trigger and/or metadata provided from the metadata tunnel system 140, for example via the optional second injection system 134*b*.

The control subsystem may, for example, determine to insert a new or replacement programming content segment upon detecting meta data or a marker indicative of a start of a replaceable programming content segment in the broadcast programming 118. The new or replacement programming content segment may, for example, be selected based on some mediacast content consumer specific information (i.e., content consumer replacement programming content selection criterion), supplied by a specific mediacast content consumer media player 104 (FIG. 1).

The control subsystem provides control signals to the buffer 24 via a buffer control line 328*a* to control the buffering or caching of originating broadcast programming 118 by the buffer 306. The control subsystem provides control signals to the combiner 304 via combiner control line 328*b* to control the combining of new or replacement programming and/or non-programming content segments with non-replaceable programming and/or non-programming content segments of the broadcast programming 112. The control signals may cause the buffer 306 to selectively store or buffer originating broadcast programming 118 while the combiner 304 is combining or inserting or placing replacement programming or non-programming content segments to generate or create the alternative (e.g., streamed) programming 118.

The injection system(s) 134 may select replacement programming content segments based on any variety of factors or selection criterion. The injection system(s) 134 may select replacement non-programming content segments based on any variety of factors or selection criterion.

The injection system(s) 134 may be similar, or even identical, in structure and/or operation to the content injection system described in U.S. patent application publication No. 2008/0120638 published May 22, 2008 or U.S. patent application Ser. No. 61/561,186 filed Nov. 17, 2011. That content injection system advantageously employs selective buffering or caching so that replacement programming or non-programming content segments do not need to be exactly the same length or duration as the replaceable programming or non-programming content segments they supplant. Additionally, or alternatively, the injection system(s) 134 may in some respects be similar or identical in structure and/or operation to that described in U.S. patent application publication No. 2007/0074243. Additionally, or alternatively, the injection system(s) 134 may in some respects be similar or identical in structure and/or operation to that described in U.S. Pat. No. 6,577,716.

Data, Data Structures, and Nontransitory Storage Media

Various nontransitory media discussed above may store information such as data including configuration information in one or more data structures. Data structures may take a variety of forms, for example records associated with relational databases, a database itself, lookup tables, etc. The data structures may store a variety of different information or data.

Operation

Figure 3:
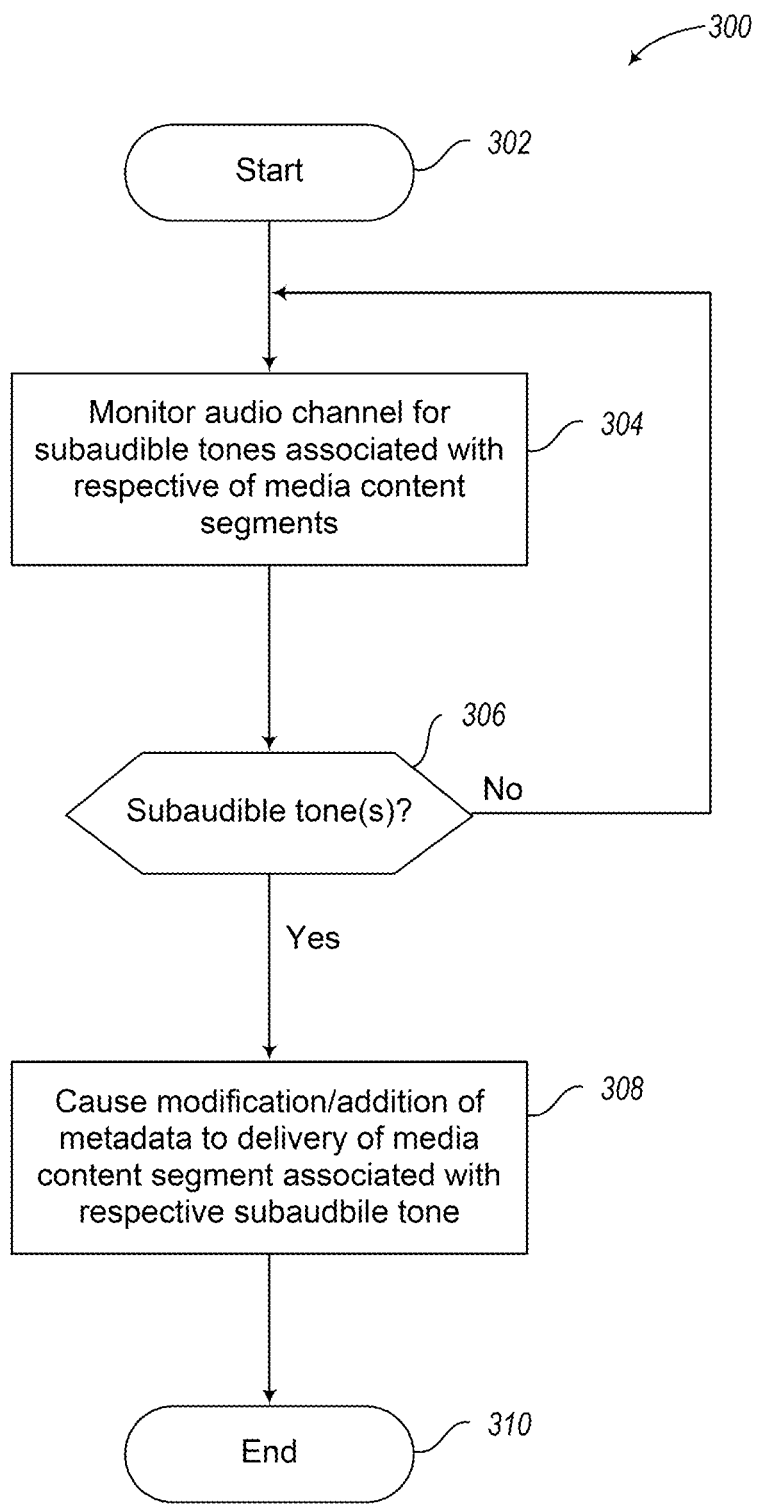
FIG. 3 is a flow diagram that shows a high level metadata processing method of operation of one or more components of a content delivery system to provide content to media players, according to one illustrated embodiment.

FIG. 3 shows a high level metadata processing method 300 of operation in at least a portion of a content delivery system, according to one illustrated embodiment.

The metadata processing method 300 starts at 302. For example, the high level method 300 may start on powering up of a component or device of the content delivery system, for instance powering up the metadata tunnel system 140 or receipt of programming or metadata thereby. Alternatively, the method may start in response to a launching of an application by an end user or client or media player 104, or in response to a call from a calling routine executing on a client device or media player 104.

At 304, a subaudible tone detection subsystem 144, for example of a metadata tunnel system 140, monitors an audio channel for subaudible tones associated with respective ones of a plurality of content segments.

The content segments may take the form of audio content segments, for instances audio content segments intended and suitable for inclusion in a terrestrial (e.g., over the air) radio broadcast by a radio broadcaster. The content segments may take the form of video content segments, for instances video content segments intended and suitable for inclusion in a terrestrial video (e.g., television) broadcast by a television broadcaster. Notably, video or television content typically includes one or more audio channels along with the picture or image channel. The content segments may be received from one or more content providers 112 (FIG. 1). The content segments may include media content segments, which include material that is the principal subject or focus of the broadcast. Such may, for instance, include dramas, music or songs, talk shows, etc. The content segments may also include advertising content segments or advertisements which are typically revenue generating segments for the broadcaster 102. The various content segments may include conventional markers which indicated a start, and optional an end of the content segment. The content segments may also include subaudible tones, for instance inserted by the content provider(s) 112. The subaudible tones act as signals that trigger certain actions to be taken, that identify certain actions to be taken, and/or that identify the content provider. Such may, or may not, be associated with a start or an end of a content segment.

As an example, a subaudible tone detection subsystem 144 may receive content segments on an audio channel. The subaudible tone detection subsystem may receive content segments directly, or indirectly, from at least one primary media source. For instance, subaudible tone detection subsystem 144 may receive content segments via a satellite receiver from a satellite feed of audio or video content.

The subaudible tone detection subsystem 144 may receive an audio channel of the programming including the content segments without any associated metadata. Alternatively, the subaudible tone detection subsystem 144 may receive an audio channel of the programming including the content segments which are logically associated with respective existing metadata.

At 306, the subaudible tone detection subsystem 144 determines whether subaudible tone(s) have been detected in the original programming received by the subaudible tone detection subsystem 144. As discussed in detail below, the subaudible tone detection subsystem 144 may monitor the audio channel for subaudible tones of one or more defined frequencies and/or which persist for one or more defined periods or durations. As also discussed below, each frequency and/or duration may be logically associated with a respective one or more rules or sets of instructions of a plurality of rules or sets of instructions. Thus, the subaudible tones may act as signals to trigger certain actions defined by the rules or sets of instructions. Consequently, the subaudible tone detection subsystem 144 or a metadata processing subsystem 146 may identify defined rule(s) or set(s) of instructions based on defined frequency/frequencies, the defined duration(s), or combinations thereof. In some implementations, the frequency of the subaudible tone is mapped to, or otherwise identifies the rules(s) or set(s) of instructions. In such implementations, the defined duration(s) may simply serve to prevent unintentional subaudible tones (e.g., transients, noise) from inadvertently triggering an action. In other implementations, combinations of frequencies and durations are mapped to, or otherwise identify respective rule(s) or set(s) of instructions.

At 308, the metadata processing subsystem 146 may cause at least one of a modification and/or an addition of metadata to a delivery of a respective one of the content segments (e.g., media content segment, advertising content segment) which is logically associated with the respective detected subaudible tone. As discussed in detail below, that may include instructing or otherwise causing a downstream component (e.g., injection system(s) 134, encoder 128) to perform in a certain fashion. For example, the metadata processing subsystem 146 may take one or more actions, as indicated by a rule or set of instructions, which cause a downstream component to substitute or add new metadata, or alternatively to pass the media content without substituting or adding (i.e., collectively inserting) new or modified metadata. The particular metadata to be inserted may be specified by the rule or set of instructions indicated by the detected subaudible tone.

In some implementations, a metadata processing subsystem 146 may determine a respective one of a number of action(s) to take based at least in part on a quantifiable aspect of subaudible tones. The action(s) may specify which downstream component (e.g., injection system(s) 134, encoder 128) the metadata is to be provided, the downstream component preferably being upstream of a media player 104. The action(s) may identify or specify the content of the metadata. The action(s) may specify whether the metadata should be added in place of existing metadata, modify existing metadata, or is to be included where there is no existing metadata associated with the content segment. In response, the metadata processing subsystem 146 may cause the downstream component to include identified metadata in a delivery of media content segments. For example, the metadata processing subsystem 146 may cause advertisement insertion component allow an original advertising content segment to pass without replacement, and/or to include identified metadata in a delivery of one or more content segments (e.g., audio or video content segment(s)).

The metadata processing method 300 may terminate at 310 until called again, or may continually repeat. Alternatively, the metadata processing method 300 may run concurrently with other methods or processes, for example, as one of multiple threads on a multi-threaded processor system.

Figure 4:
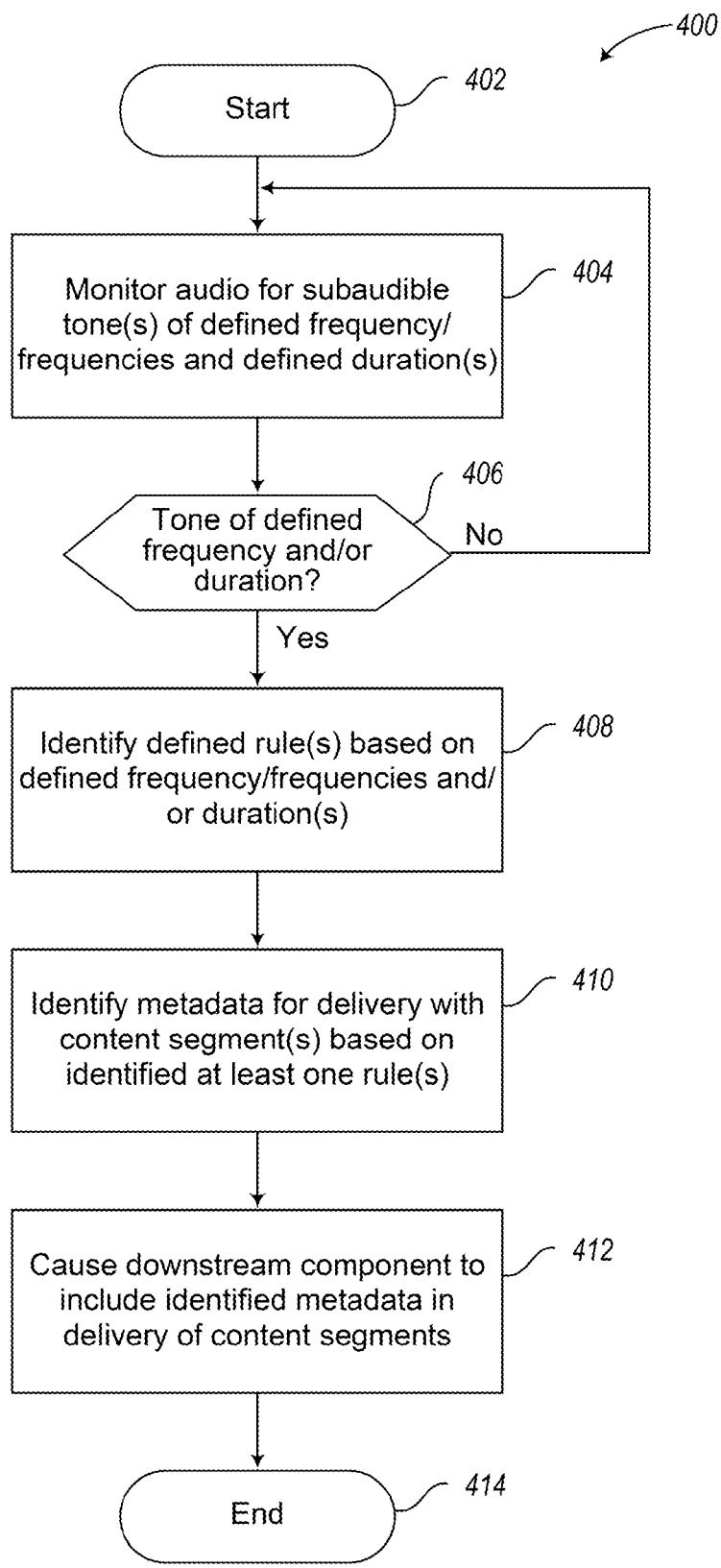
FIG. 4 is a flow diagram that shows a low level method of operating one or more components of a content delivery system to provide content to content consumers in a networked environment, including identifying rules or sets of instructions based on detected tones, according to one illustrated embodiment, which may be useful in performing at least a portion of the method illustrated in FIG. 3.

FIG. 4 shows a low level metadata processing method 400 of operation in at least a portion of a content delivery system, including identifying rules or sets of instructions based on detected tones, according to one illustrated embodiment. The low level metadata processing method 400 may be executed in performing at least a portion of the high level metadata processing method 300 (FIG. 3).

The metadata processing method 400 starts at 402. For example, the method 400 may start on powering up of a component or device of the content delivery system, for instance the metadata tunnel system 140. Alternatively, the metadata processing method 400 may start in response to a launching of an application by an end user or client media player 104, or in response to a call from a calling routine executing on a client device or media player 104.

At 404, a subaudible tone detection subsystem 144 of the metadata tunnel system 140 monitors an audio channel for subaudible tones of defined frequencies and/or durations, associated with respective ones of a plurality of content segments (e.g., media content segments, advertising content segments) of the programming 118 received from a content provider 112.

At 406, the subaudible tone detection subsystem 144 determines whether a subaudible tone of one or more defined frequencies and/or durations is detected on the audio channel.

In response to detection of a subaudible tone of a defined frequency and/or duration, a metadata processing subsystem 146 the metadata tunnel system 140 identifies one or more defined rules or sets of instructions which specify actions to be taken in response to the detected subaudible tone at 408. In particular, the metadata processing subsystem 146 may determine a respective one of a number of action(s) to take based at least in part on an aspect (e.g., frequency, duration, frequency and duration) of the subaudible tones. The action may include whether to pass existing metadata or insert (i.e., substitute, add) new or modified metadata. The action may specify a downstream component (e.g., injection system(s) 134, encoder 128) to which at least some metadata is to be provided. The specified downstream component may be located upstream of an end user media player 104. The action may specify the contents of the metadata to be inserted. If a subaudible tone of a defined frequency and/or duration is not detected, a loop may be executed, control returning to the repeat the monitoring at 404.

At 410, the metadata processing subsystem 146 identifies metadata to be included in a delivery of the media content segment(s). The metadata processing subsystem 146 may identify the metadata based at least in part on the identified at least one rule(s) or set(s) of instructions.

At 412, the metadata processing subsystem 146 may cause downstream component (e.g., injection system(s) 134, encoder 128) to include identified metadata in delivery of content segments. For example and as discussed in detail herein, the metadata processing subsystem 146 may cause new metadata to be inserted or supplied to an injector system 134a that normally injects advertisements, for instance in place of existing advertisements in the original received programming 118. Also for example and as discussed in detail herein, the metadata processing subsystem 146 may alternatively or additionally cause new metadata to be inserted or supplied to an encoder 128. Thus, the metadata processing subsystem 146 may cause an encoder 128 to encode at least some of the content segments and/or at least some modified metadata for streaming delivery via the encoder, for delivery to an end user media content player or client 104.

The low level metadata processing method 400 may terminate at 414 until called again, or may continually repeat. Alternatively, the metadata processing method 400 may run concurrently with other methods or processes, for example, as one of multiple threads on a multi-threaded processor system.

Figure 5:
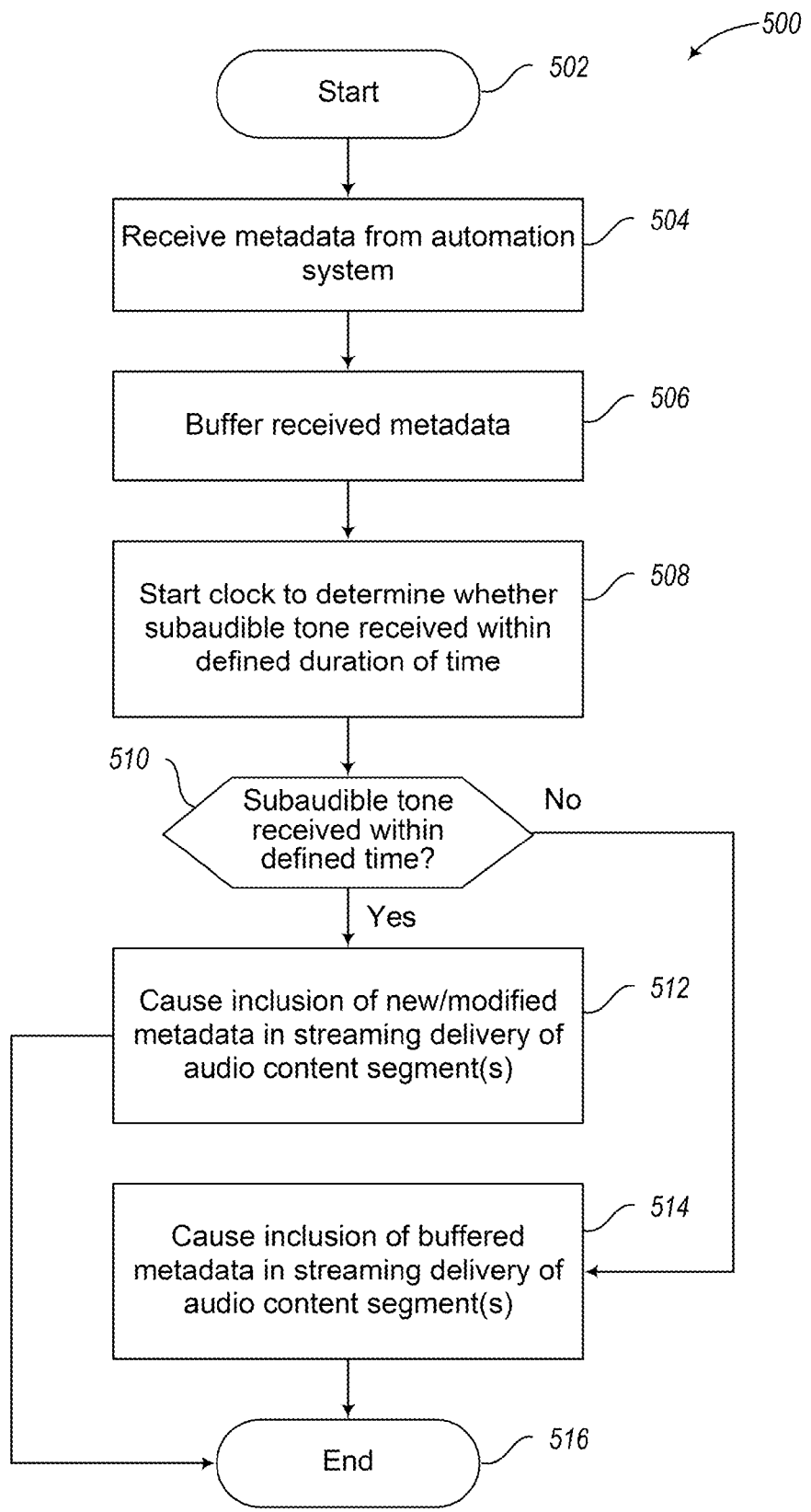
FIG. 5 is a flow diagram that shows a low level method of operating one or more components of a content delivery system to provide content to content consumers in a networked environment, including buffering metadata, according to one illustrated embodiment, which may be useful in performing at least a portion of the method illustrated in FIG. 3.

FIG. 5 shows a low level metadata processing method 500 of operation in at least a portion of a content delivery system, including buffering metadata, according to one illustrated embodiment. The low level metadata processing method 500 may be useful in performing at least a portion of the high level metadata processing method 300 (FIG. 3) or the low level metadata processing method 400 (FIG. 4).

The method 500 starts at 502. For example, the method 500 may start on powering up of a component or device of the content delivery system, for instance the metadata tunnel system 140. Alternatively, the metadata processing method 500 may start in response to a launching of an application by an end user or client, or in response to a call from a calling routine executing on a client device media player 104.

At 504, a metadata receive subsystem 144 receives metadata, for example from an automation system. The received metadata may be intended for inclusion in the delivery of the respective audio content segment. At 506, the metadata receive subsystem 144 buffers the received metadata in a buffer.

At 508, a subaudible tone detection subsystem 144 starts a clock on order to determine whether a detected subaudible tone on an audio channel and associated with the respective content segment having a defined frequency and/or defined duration is received within defined duration of time. At 510, the subaudible tone detection subsystem 144 determines whether a subaudible tone was received within the defined time.

At 512, in response to a determination that the subaudible tone of the defined duration and the defined frequency was received within the defined duration of time, a metadata processing subsystem 146 causes provision of at least one modified piece of metadata to a downstream component. Such may, for example, cause inclusion of the modified metadata in a streaming delivery of the respective one of the content segment(s).

At 514, in response to a determination that the subaudible tone of the defined duration and the defined frequency is not received within the defined duration of time, the metadata processing subsystem 146 causes inclusion of buffered metadata in streaming delivery of the respective one of the audio content segment(s). The buffered metadata data may be original, unmodified metadata. Alternatively, buffered metadata may be subsequently modified.

The low level metadata processing method 500 may terminate at 516 until called again, or may continually repeat. Alternatively, the metadata processing method 500 may run concurrently with other methods or processes, for example, as one of multiple threads on a multi-threaded processor system.

Figure 6:
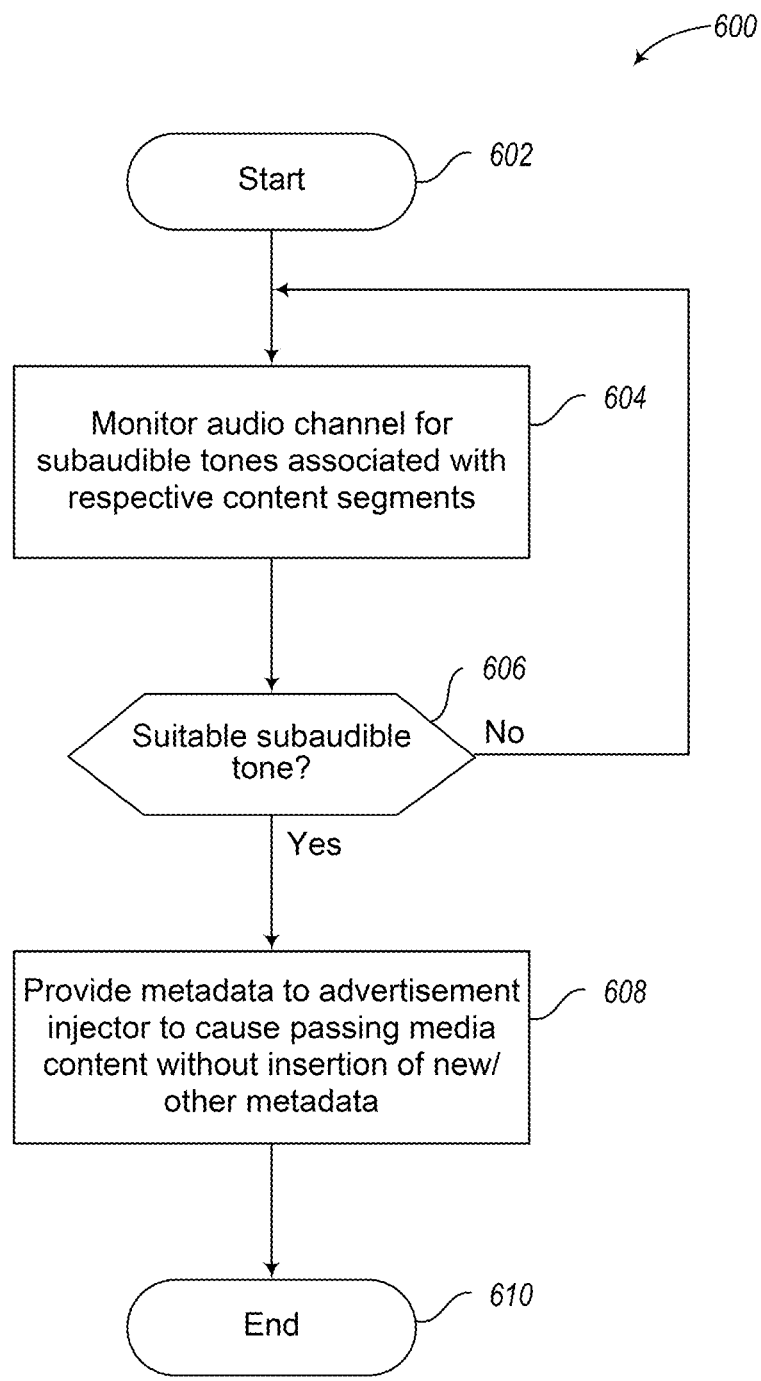
FIG. 6 is a flow diagram that shows a low level method of operating one or more components of a content delivery system to provide content to content consumers in a networked environment, including providing metadata to an injection system to prevent an insertion of alternative content, according to one illustrated embodiment, which may be useful in performing at least a portion of the method illustrated in FIG. 3.

FIG. 6 shows a low level method of operating one or more components of a content delivery system to provide content to content consumers in a networked environment, including providing metadata to an injection system to prevent an insertion of alternative content, according to one illustrated embodiment. The low level metadata processing method 600 may be executed in performing the high level metadata processing method 300 (FIG. 3) or the low level metadata processing method 400 (FIG. 4).

The method 600 starts at 602. For example, the method 600 may start on powering up of a component or device of the content delivery system, for instance the metadata tunnel system 140. Alternatively, the metadata processing method 600 may start in response to a launching of an application by an end user or client media player 104, or in response to a call from a calling routine executing on a client device media player 104.

At 604, at least one device monitors an audio channel of programming 118 for subaudible tones associated with respective ones of at least some of a plurality of content segments (e.g., media content segments, advertising content segments). For example, a subaudible tone detection subsystem may monitor the audio channel for subaudible tone of a defined frequency and/or defined duration(s). At 606, the at least one device determines whether a suitable audible tone is detected. In response to detection of at least some defined subaudible tones (e.g., subaudible tones of defined frequencies and durations) control passes to 608. Otherwise, control may return to the monitoring 604, forming a loop.

At 608, in response to detection of at least some defined subaudible tones (e.g., subaudible tones of defined frequencies and durations), the at least one device provides metadata to a downstream component, for instance an injector system 134a which is normally operated to inject replacement advertisements into the programming 118 in place of existing replaceable advertisements. Various entities, for instance the content provider 112, may not want the original advertisements to be replaced. The metadata tunnel system 140 allows those entities to control operation of the injection system(s) 134, possibly circumventing part of the operation of the injection system(s) 134.

The provided metadata causes the injection system(s) 134 to pass the respective content segment without replacement or without insertion of other new/other metadata. Thus, the alternative programming feed 108 may retain the original advertising segments found in the original received programming 118.

As previously explained, the at least one device may identify one or more defined rule(s) or set(s) of instructions to apply based on at least one of the defined frequency and/or the duration of the subaudible tone in the audio channel. The at least one device may, for example, identify at least one piece of substitute metadata for provision to a downstream component (e.g., injector system 134a, encoder 128) and/or for inclusion in a delivery of the respective one of the content segments based on the identified at least one rule. The at least one device may, for example, cause a downstream component to include the identified at least one piece of substitute metadata in the delivery of the respective one of the content segments in response to the identified at least one rule.

The low level metadata processing method 600 may terminate at 610 until called again, or may continually repeat. Alternatively, the metadata processing method 600 may run concurrently with other methods or processes, for example, as one of multiple threads on a multi-threaded processor system.

In a streaming content delivery system, where content segments may not have identifying metadata information associated therewith, or may have associated metadata information that cannot be adequately utilized to identify attributes of the content segments, another approach must be utilized to identify the content segments, and to add or modify the metadata. Such may advantageously be accomplished via detection of subaudible tones, for example as described herein and illustrated in FIG. 7.

Any number of primary content or programming source audio channels (e.g., stereo channel, mono channel) may be combined and directly fed into one or more audio input channels of a metadata tunnel system 140 (FIG. 1).

Metadata providers, such as an automation system 132, may also transmit metadata to a metadata receive subsystem 142 of a metadata tunnel system 140. The metadata contains content attributes (e.g., metadata specifying various attributes of content such as content provider identifier, content type, content replaceability) that are synchronized in time to correlate with a start of media playback on at least one audio channel. Such may be accomplished via any of a large variety of methods or number of device interconnectivity methods, such as an IP network or serial communication ports.

A subaudible tone detection subsystem 144 continually monitors the primary media sources from the audio input channels for defined subaudible tones (e.g., subaudible tones of defined frequencies and/or durations). If the metadata receive subsystem 142 receives the synchronized metadata associated with at least one primary media source, the metadata receive subsystem 142 stores the received metadata in a metadata buffer, and resets a timer (e.g., Max Tone Wait) to zero. The time period of the Max Tone Wait timer is determined by configuration data and sets an amount of time to wait for a defined subaudible tone to occur.

If the Max Tone Wait timer elapses and no defined subaudible tone has been detected on at least one audio channel, a metadata processing subsystem 146 may forward the buffered metadata to another component (e.g., injection system(s) 134, encoder 128) in the streaming chain. The buffered metadata may be forwarded in its original form, or the metadata processing subsystem 146 may modify the metadata or add metadata, according to defined rules or sets of instructions. The rules or sets of instructions may be user defined, and may be set or maintained in a configuration file (e.g., Non-detect Profile) stored on a computer- or processor-readable nontransitory medium. In some implementations, the rules or sets of instructions in the Non-detect Profile configuration file may indicate the particular component to which the resulting new or modified metadata is to be sent.

If the Max Tone Wait timer elapses, and a defined subaudible tone has been detected on at least one audio channel, the metadata processing subsystem 146 may generate entirely new metadata. The new or modified metadata may optionally include data fields from the original buffered metadata. The resulting new or modified metadata may be structured based on at least in part on a rule or set of instructions indicated by, for instance a frequency of the detected defined subaudible tone. The rules or sets of instructions may be user-defined metadata creation rules or instructions which may be set or maintained in a configuration file (e.g., Detect Profile) stored on a computer- or processor-readable nontransitory medium. The metadata processing subsystem 146 may transmit the resulting new or modified metadata to another component (e.g., injection system(s) 134, encoder 128) in the streaming chain. In some implementations, the rules or sets of instructions in the Detect Profile configuration file may indicate the particular component to which the resulting new or modified metadata is to be sent.

Alternatively, where the primary media sources that do not transmit metadata to the metadata receive subsystem 142, the metadata processing subsystem 146 can immediately generate or supply new metadata in response to detection of defined subaudible tones.

An algorithm for performing such is set out with reference to FIG. 7, below.

Figure 7:
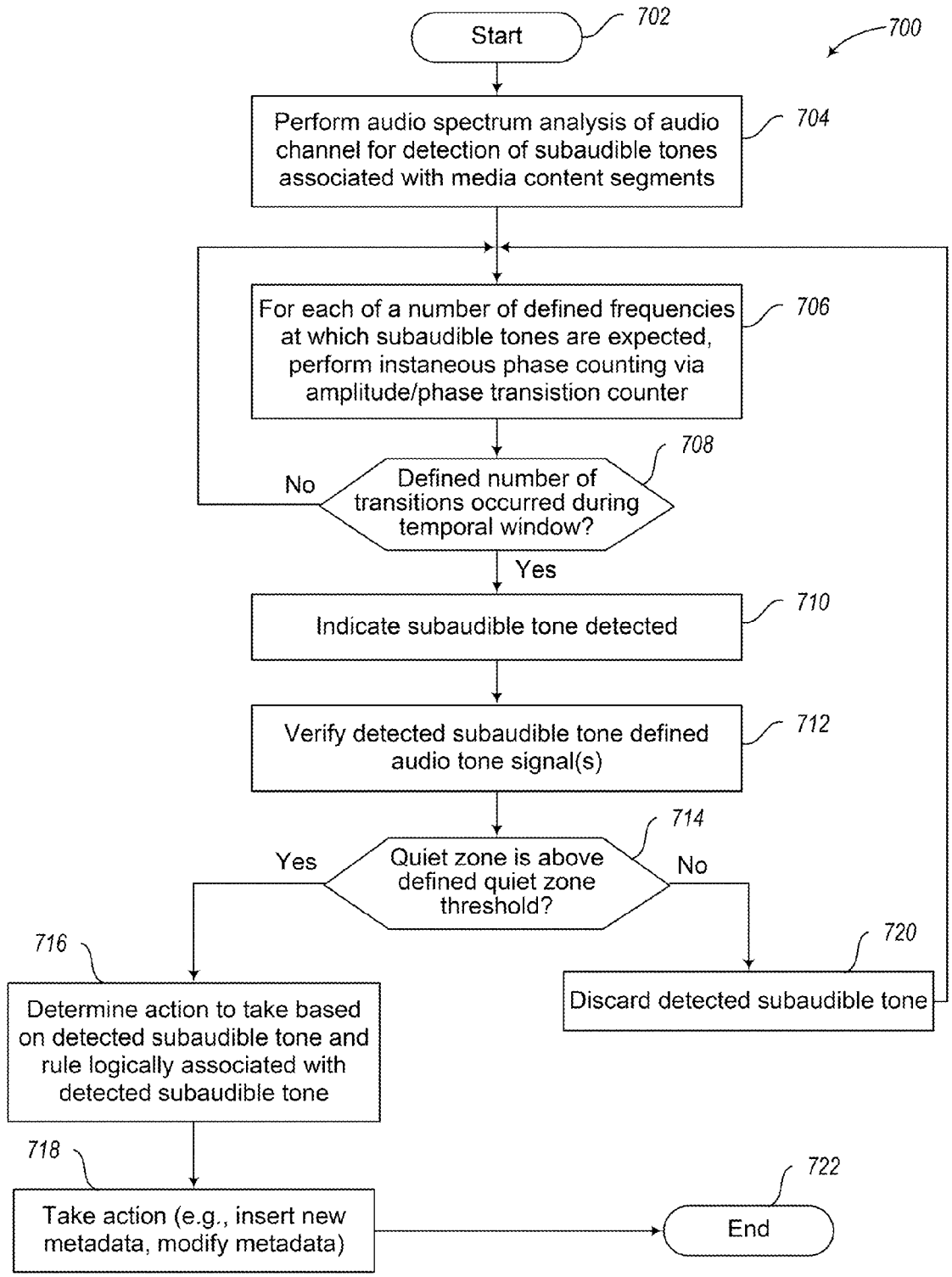
FIG. 7 is a flow diagram that shows a low level method of operating one or more components of a content delivery system to provide content to content consumers in a networked environment, including identifying transitions, verifying detected subaudible tones, and checking a quiet zone, according to one illustrated embodiment, which may be useful in performing at least a portion of the method illustrated in FIG. 3.

FIG. 7 shows a low level method of operating one or more components of a content delivery system to provide content to content consumers in a networked environment, including identifying transitions, verifying detected subaudible tones, and checking a quiet zone, according to one illustrated embodiment. The low level metadata processing method 700 may be executed in performing the high level metadata processing method 300 (FIG. 3) or the low level metadata processing method 400 (FIG. 4).

The method 700 starts at 702. For example, the method 700 may start on powering up of a component or device of the content delivery system, for instance the metadata tunnel system 140. Alternatively, the metadata processing method 400 may start in response to a launching of an application by an end user or client media player 104, or in response to a call from a calling routine executing on a client device or media player 104.

Optionally, an end user may be prompted to select between a regular performance mode and a high performance mode. In the high performance mode, audio spectrum analysis of the audio channel may be performed using a fast Fourier transform analysis technique with a sliding widow.

The high performance mode sets the subaudible tone detection subsystem 146 to its fastest detection rate by enabling an amplitude/phase transition counter (APTC) detection stage, and is capable of detecting an audio sine wave in at least two cycles of the frequency selected. The APTC stage may advantageously employ an amplitude/phase transition counter (APTC) to count transitions.

In the high performance mode, the defined subaudible tone should be a pure sine wave, with enough audio cycles to meet duration requirements set in configuration information, and edited in such a way as to prevent the sine wave from beginning or ending in any phase other than 0 and 180 degrees, providing a smooth starting and ending transition to zero amplitude. Any clipping of the subaudible tone outside of the sine wave zero amplitude points at 0 and 180 degrees will result in the injection of unwanted harmonics, which may end up being audibly detectable by the listener at the media player 104.

In the high performance mode, a subaudible tone should be only transmitted on a single audio channel of a stereo (two channel) signal. A lot of frequency content that could causes false triggering is typically due to environmental noise injection, which generally propagates as a stereo signal. By having a subaudible tone on a single channel of a stereo signal, the subaudible tone detection subsystem 146 can reduce the probability of error rates by checking for the absence of signal in the opposite audio channel. Due to the use of the APTC in the high performance mode, amplitude of the subaudible tone is less important than the system noise floor. A subaudible tone can be reduced in amplitude by a significant amount, if the noise floor of the system is low enough to prevent erratic phase transitions, and minimum harmonic distortion.

The regular performance mode will likely be only in high noise environments. The APTC is disabled in the regular performance mode. Thus, the regular performance mode relies solely on the audio spectrum analysis (e.g., Fast Fourier transform) and quiet zone analysis based on defined quiet zones to detect defined tones in the programming.

At 704, a tone detection subsystem 144 performs audio spectrum analysis of an audio channel for detection of subaudible tones associated with respective ones of at least some of a plurality of media content segments on the audio channel. For example, the tone detection subsystem 144 may perform fast Fourier transform analysis with a sliding widow for reducing audio signals into their respective frequency components. Alternatively, the tone detection subsystem 144 may use any type of frequency analysis calculation. The resolution and accuracy of the frequency separation is determined by standard rules specified in configuration and parameter criteria for the fast Fourier transform. The configuration and parameter criteria may be defined in configuration data stored on non-transitory computer- or processor-readable media.

At 706, for each of a number of defined frequencies at which subaudible tones are expected, the tone detection subsystem 144 performs instantaneous phase counting that counts transitions of at least one of amplitude or phase. In particular, the tone detection subsystem 144 may include an amplitude/phase transition counter (APTC) communicatively coupled to count the transitions. The APTC is a highly accurate frequency detector used. Such will likely be used only in a high performance mode of operation with primary content or programming sources that maintain a high signal to noise ratio, little to no direct current (DC) offset, and single frequency triggering of subaudible tones below a Nyquist frequency of a selected sampling rate. The APTC monitors the audio in real-time to look for complete transitions in signal instantaneous phase of approximately 180 degrees. The phase transition for the frequency of interest (i.e., defined frequency/frequencies) occurs in a duration of time that is represented by an amount of individual audio samples required to fit a time span of a half cycle of the defined frequency being monitored. Such may be determined by the formula:

$$SampleQuantity = (SampleRate/Frequency)/2$$

At 708, the tone detection subsystem 144 determines if defined number of transitions occurred during temporal window. In particular, an amount of time (i.e., Jitter Window) required for the completion of the phase transition is allowed to drift in sample quantity, and thus time, by an amount determined in the configuration information. This allows for the compensation of frequency jitter in the sampling clocks of multiple devices, which would cause a proportional shift in the frequency of the predefined subaudible tones. Each time the APTC detects one successful phase transition, a counter is incremented. If a next phase transition occurs outside of the Jitter Window timeframe, the counter is reset.

In response to a determination that the defined number of transitions did not occur during the temporal window, control may optionally return to process another defined frequency at 706. Alternatively, the metadata processing method 700 may terminate at 722.

In response to a determination that the defined number of transitions occurred during the temporal window, at 710 the tone detection subsystem 144 indicates subaudible tone has been detected. For example, the tone detection subsystem 144 may set a flag in a register. In particular, if the counter meets the amount of half cycles required by the configuration information for the detection threshold, the APTC sets a detection flag, and passes the detected subaudible tone samples to on for additional evaluation.

At 712, the tone detection subsystem 144 verifies that the detected subaudible tone is one of a number of defined subaudible tone signal(s). The metadata tunnel system 140 allows for the definition of multiple frequency bands to be used as a defined subaudible tone. Each defined frequency may have its own respective defined rules or sets of instructions. These rules or instructions may be defined or stored in the configuration information, stored on some nontransitory computer- or processor-readable media. The frequencies, rules or instructions, and or mapping or logical relationships therebetween may be user defined. The rules or sets of instructions may be used in the creation or modification of new metadata. In particular, the tone detection subsystem 144 may compare a frequency and/or duration of the detected subaudible tone to a defined frequency or frequencies and/or duration(s). Thus, one or more defined subaudible tones may be characterized by defined frequency/frequencies and/or duration, each mapped or logically associated with a respective rule or set of instructions. Various audio signal processing techniques may be employed to determine if a detected subaudible tone is of a defined frequency and/or duration. Thus, as indicated as above, the additional evaluation may include verifying if the detected subaudible tone is a detected defined subaudible tone signal (e.g., defined frequency and/or defined duration). If so, the detected subaudible tone samples may optionally undergo further analysis, as described immediately below with respect to quiet zones.

At 714, the tone detection subsystem 144 determines whether a quiet zone is above defined quiet zone threshold. Such helps to ensure that a defined subaudible tone was detected as opposed to some noise or transients. Quiet zones are one or more frequency bands in the audio spectra that must be below a certain sound threshold level (i.e., Quiet Threshold) which is stored in the configuration information. Each defined frequency, or frequency range in the quiet zone may have its own respective value(s) for the Quiet Threshold.

The quiet zone is used to prevent false subaudible tone detection by insuring that frequency content typically found in content is below the Quiet Threshold. If the subaudible tone detection subsystem 144 detects the defined subaudible tone, but the quiet zone is above the Quiet Threshold, the tone detection subsystem 144 may log a false trigger and abort the process for the particular detected subaudible tone.

In response to a determination that the quiet zone is not above the defined quiet zone threshold, at 716 a metadata processing subsystem 146 determines one or more actions to take based on detected subaudible tone and rule(s) or set(s) of instructions logically associated with detected subaudible tone.

At 718, the metadata processing subsystem 146 takes the identified action or causes the identified action to be taken by another component. For example, the metadata processing subsystem 146 may supply new or modified metadata to a downstream component (e.g., injection system(s) 134, encoder 128) and/or may otherwise cause new or modified metadata to be delivered associated with the respective content segment. Alternatively or additionally, the metadata processing subsystem 146 may modify metadata.

In response to a determination that the quiet zone is above the defined quiet zone threshold, at 720 the tone detection subsystem 144 discards detected subaudible tone. Control may then optionally return to process another defined frequency at 706. Alternatively, the metadata processing method 700 may terminate at 722.

The low level metadata processing method 700 may terminate at 722 until called again, or may continually repeat. Alternatively, the metadata processing method 700 may run concurrently with other methods or processes, for example, as one of multiple threads on a multi-threaded processor system.

Modifications

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary system generally described above.

For instance, network and even non-networked topologies other than those illustrated and/or described may be employed. For example, the selectors may be collocated with the manifest generators or separately therefrom. The selectors may be located remotely from the manifest generators, for instance "in the cloud" or even be collocated with the broadcasters or Webcasters, such as with the alternative content inserters. Also for example, the selectors and/or manifest generators may be collocated or may be geographically distributed with respect to one another, and/or with respect to the alternative content manager and/or portal systems. As a further example, the alternative content inserters may be located remotely from the broadcasters or Webcasters, or example "in the cloud." As noted above, the alternative content inserters may do nothing more than detect segments or periods of replaceable content which may indirectly trigger alternative content insertion.

When played on a client device, the client device is triggered by, or otherwise employs, the manifest to retrieve the content or media fragments into which the broadcast or Webcast programming and the replacement or substitute advertisements that replace or substitute for the original advertisements in the feed have been broken. The client device may retrieve the content or media fragments from a variety of different sources, for instance, one or more CDNs, an advertiser network server computer system, an advertising network, and/or a third party advertisement aggregator.

As previously explained, the replacement or substitute advertisements may be targeted to the intended audience and/or may be selected based on various external factors, as well as to maximize revenue generation. In this respect, one or more components may rely on metadata. This metadata may simply specify characteristics of the advertisement section which is being replaced, for example specifying a start time, stop time, duration, language, and/or demographic market. A component, for example a selector or an alternative content inserter may use the information, as well as additional information specific to the user to identify and/or retrieve the replacement or substitute advertisements. For example, the component may use information regarding a user's browsing habits or shopping habits stored in one or more cookies on the user device to identify and/or retrieve the replacement or substitute advertisements. Additionally, or alternatively, the component may use other information for example a current location (e.g., via GPS receiver or cellular triangulation), actual or predicted weather based on current location, to identify and/or retrieve the replacement or substitute advertisements. Alternatively, the metadata may directly specify the replacement or substitute advertisements or specify a location (i.e., logical address) for retrieving the replacement or substitute advertisements.

The selectors are triggered by, or otherwise employ, the metadata to retrieve replacement or substitute advertisements to replace or substitute for the original advertisements in the feed. The selectors may be server computer systems that retrieve the replacement or substitute advertisements from a variety of different sources, for instance, an advertiser network server computer system, an advertising network, and/or a third party advertisement aggregator. As previously explained, the replacement or substitute advertisements may be targeted to the intended audience and/or may be selected based on various external factors, as well as to maximize revenue generation. In this respect, metadata may simply specify characteristics of the advertisement section which is being replaced, for example specifying a start time, stop time, duration, language, and/or demographic market. The media server(s) may, for example, use the information, as well as additional information specific to the targeted end user to identify and/or retrieve the replacement or substitute advertisements. For example, the selector(s) may use information regarding a user's browsing habits or shopping habits stored in one or more cookies on the user device or elsewhere to identify and/or retrieve the replacement or substitute advertisements. Additionally, or alternatively, the selector(s) may use other information for example a current location (e.g., forwarded by a client device) and/or actual or predicted weather based on current location, to identify and/or retrieve the replacement or substitute advertisements. Alternatively, the metadata may directly specify the replacement or substitute advertisements or specify a location (i.e., logical address) for retrieving the replacement or substitute advertisements.

As discussed above, selection may be based at least in part on a monetary value realizable by the placements of the advertisements. Thus, the determination or selection may additionally, or alternatively be based on one or more other factors or parameters. For example, the determination or selection may be based at least in part on format, language, general demographic or specific demographic information, and/or duration or length of material. Such may be performed, for example, based on demographic information regarding the audience, demographic information regarding the target audience for the advertisement, and/or maximize advertising revenue generated by the advertisement insertions. Such may be responsive to a prioritization scheme or hierarchy. Various prioritization schemes or hierarchies may be employed. For example, highest priority may be given to already sold or bartered advertisements. Next highest priority may be given to advertising placements booked by one or more advertisement placement networks. Guaranteed advertisement placement opportunities may take precedence over non-guaranteed ones. The next highest priority may be given to advertisements sold by a station or local broadcaster or other content provider. Priority may then be based on various dynamic factors and or dynamic pricing. For example, certain reservations, requests or offers for advertising placement opportunities may produce higher revenue than other reservations, requests or offers for the same advertising placement opportunities. Such may, for example occur due to some external condition, even or circumstance. The preference scheme or hierarchy may automatically account for dynamic changes in pricing, inserting or causing the insertion of advertising the results in the highest revenue, or highest cumulative revenue for the content provider and/or advertisement placement network. Lowest in priority may, for example, include non-revenue producing, for instance public service announcements or a content providers own advertisements for its own content.

At least some of the implementations described herein take a server side approach. Taking a server side approach advantageously avoids the need to customize client code for each playback platform, while still providing targeted media for manifest/fragment capable media players. Depending on the approach taken, a client-side layer could still be added on top of the server-side layer to provide even more level of targeting detail and flexibility.

The implementations described herein can work with all current and future manifest protocols. Examples of current manifest protocols include: M3U8 (Apple HLS), ISML (MSFT Smooth), F4M (Adobe "San Jose"). An example of a possible future manifest protocol includes MPEG DASH or other follow on interactions.

As used herein digital media is used to refer to encoded content, for example encoded content which content is programming content for a terrestrial broadcast or Webcast. As used herein primary content refers to the original media stream, for example the programming content for a terrestrial broadcast or Webcast. As used herein alternative content refers to content that will replace some portion of the primary content, which typically is pre-encoded media. As used herein replaceable content refers to primary content that is flagged or other was identified or identifiable as being replaceable by alternative content. As used herein manifest content refers to a set of entries that specify locations and/or specific properties of content or media fragments, specifying a linear or sequential order. A used herein manifest consumer device refers to a client (e.g., media player executing on a processor-based device) that requests and utilizes manifest content. As used herein dynamic manifest refers to a manifest file that is generated upon a request of a manifest consumer device. As used herein content or media fragment refers to a digital media 'file' into which content has been broken, typically having a duration of 2-10 seconds. Presently, content or media fragments are primarily based on fragmented mp4 (FMP4) or MPEG TS (M2TS).

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

The various embodiments described above can be combined to provide further embodiments. To the extent that they are not inconsistent with the specific teachings and definitions herein, U.S. patent application Ser. No. 11/958,143, published as Publication No. 2008-0120638; U.S. provisional patent application Ser. No. 61/561,186 filed Nov. 17, 2011; and U.S. provisional patent application Ser. No. 61/611,403 filed Mar. 15, 2012 are each incorporated herein by reference, in their entireties. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of at least one device in a content delivery system, the method comprising:

monitoring an audio channel for subaudible tones associated with respective ones of at least some of a plurality of media content segments on the audio channel, by the at least one device;

in response to at least some of the subaudible tones, causing at least one of a modifying or an adding of metadata to a delivery of the media content segment associated with the respective subaudible tone, by the at least one device; and providing the metadata to an advertisement injection system located relatively downstream of the at least one device which causes the advertisement injection system to pass the respective content segment without modification of any attributes thereof, by the at least one device, wherein responsive to an absence of the provided metadata the advertisement injection system modifies at least one attribute of the respective content segment.

2. The method of claim 1 wherein monitoring an audio channel for subaudible tones includes monitoring an audio only feed without any metadata for the subaudible tones, and wherein causing at least one of a modifying or an adding metadata in response includes providing the metadata to be added.

3. The method of claim 2 wherein monitoring an audio only feed without any metadata for subaudible tones includes monitoring a satellite feed of audio content which omits metadata.

4. The method of claim 1 wherein monitoring an audio channel for subaudible tones includes monitoring the audio channel of a feed of video content.

5. The method of claim 1 wherein monitoring an audio channel for subaudible tones includes monitoring an audio feed of the media content segments logically associated with respective existing metadata for the subaudible tones, and wherein causing at least one of a modifying or an adding metadata in response includes providing respective new metadata to modify the existing metadata for the respective media content segments.

6. The method of claim 1 wherein monitoring for subaudible tones includes monitoring audio for a subaudible tone of at least one defined duration and at least one defined frequency.

7. The method of claim 1 wherein the at least one device includes a subaudible tone detection subsystem and a metadata processing subsystem; the method further comprising:

receiving metadata from an automation system by the subaudible tone detection subsystem, the received metadata for inclusion in the delivery of the respective media content segment;

buffering the metadata received from the automation system;

determining by the metadata processing subsystem whether a subaudible tone associated with the respective media content segment with a defined duration and a defined frequency is received within a defined duration of time, by the at least one device; and in response to determining that the subaudible tone of the defined duration and the defined frequency is not received within the defined duration of time, causing the inclusion of the buffered metadata in a streaming delivery of the respective one of the media content segments.

8. The method of claim 1 wherein the at least one device includes a subaudible tone detection subsystem and a metadata processing subsystem; the method further comprising:

receiving metadata from an automation system by the subaudible tone detection subsystem, the received metadata for inclusion in the delivery of the respective media content segment;

buffering the metadata received from the automation system;

determining by the metadata processing subsystem whether a subaudible tone associated with the respective media content segment with a defined duration and a defined frequency is received within a defined duration of time, by the subaudible tone detection subsystem; and in response to determining that the subaudible tone of the defined duration and the defined frequency is received within the defined duration of time, causing the inclusion of at least one modified piece of metadata in a streaming delivery of the respective one of the media content segments.

9. The method of claim 1 wherein the at least one device includes a subaudible tone detection subsystem; the method further comprising:

receiving the plurality of media content segments on the audio channel by the subaudible tone detection subsystem from at least one primary media source;

encoding at least some of the media content segments and at least some modified metadata for streaming delivery by an encoder; and causing the encoded media content segments and modified metadata to be provided to an end user media content player.

10. The method of claim 1 wherein the at least one device includes a metadata processing subsystem; the method further comprising:

determining by the metadata processing subsystem a respective one of a number of actions to take based at least in part on an aspect of the subaudible tones, wherein at least one action specifies a downstream component to which at least some metadata is to be provided, the downstream component being upstream of a media player.

11. A method of operation of at least one device in a content delivery system, the method comprising:

monitoring an audio channel for subaudible tones of at least one defined duration and at least one defined frequency, the subaudible tones associated with respective ones of at least some of a plurality of media content segments on the audio channel, by the at least one device;

in response to at least some of the subaudible tones, causing at least one of a modifying or an adding of metadata to a delivery of the media content segment associated with the respective subaudible tone, by the at least one device;

identifying at least one defined rule to apply based on at least one of the defined duration or the defined frequency of the subaudible tone in the audio, by the at least one device;

identifying at least one piece of metadata for inclusion in the delivery of the respective one of the media content segments based on the identified at least one rule, by the at least one device;

causing an advertisement injection component to include the identified at least one piece of metadata in the delivery of the respective one of the media content segments in response to the identified at least one rule, by the at least one device, wherein the identified at least one piece of metadata causes the advertisement injection component to pass the respective one of the media content segments without modification of any attributes thereof, and responsive to an absence of the identified at least one piece of metadata the advertisement injection component modifies at least one attribute of the respective one of the media content segments.

12. A content delivery system, comprising:

a subaudible tone detection subsystem that monitors an audio channel for subaudible tones associated with respective ones of at least some of a plurality of media content segments on the audio channel; and a metadata processing subsystem that in response to at least some of the subaudible tones, causes at least one of a modification or an addition of metadata to a delivery of the media content segment associated with the respective subaudible tone, and the at least one of modified or added metadata causes an advertisement injection system located relatively downstream of the metadata processing subsystem to pass the respective media content segment without modification of any attributes thereof, wherein responsive to an absence of the metadata the advertisement injection system modifies at least one attribute of the respective content segment.

13. A method of operation of at least one device in a content delivery system, the method comprising:

monitoring an audio channel by the at least one device for subaudible tones associated with respective ones of at least some of a plurality of media content segments; and in response to at least some of the subaudible tones, providing metadata by the at least one device to an advertisement injector that causes the advertisement injector to pass the respective media content segment without inserting other content in the respective media content segment, wherein responsive to an absence of the provided metadata the advertisement injector modifies at least one attribute of the respective content segment.

14. A method of operation of at least one device in a content delivery system, the method comprising:

performing audio spectrum analysis of an audio channel for detection of subaudible tones associated with respective ones of at least some of a plurality of media content segments on the audio channel;

for each of a number of defined frequencies at which subaudible tones are expected, performing instantaneous phase counting that counts transitions of at least one of amplitude or phase via an amplitude/phase transition counter;

determining if a defined number of transitions occurred during a temporal window;

indicating that a subaudible tone has been detected in response to a determination that the defined number of transitions occurred during the temporal window;

in response to the indication that a subaudible tone has been detected, causing at least one of a modifying or an adding of metadata to a delivery of one of the at least some of a plurality of media content segments associated with the respective subaudible tone; and providing the metadata to an advertisement injection system located relatively downstream of the at least one device which causes the advertisement injection system to pass the respective content segment without modification of any attributes thereof, by the at least one device, wherein responsive to an absence of the provided metadata the advertisement injection system modifies at least one attribute of the respective content segment.

* * * * *